United States Patent
Sheeler et al.

(10) Patent No.: US 8,887,074 B2
(45) Date of Patent: Nov. 11, 2014

(54) RIGGING PARAMETERS TO CREATE EFFECTS AND ANIMATION

(75) Inventors: Stephen Sheeler, Santa Monica, CA (US); Gregory Niles, Culver City, CA (US); Tom Langmacher, Portland, OR (US)

(73) Assignee: Apple Inc., Cupertino, CA (US)

( * ) Notice: Subject to any disclaimer, the term of this patent is extended or adjusted under 35 U.S.C. 154(b) by 759 days.

(21) Appl. No.: 13/105,858

(22) Filed: May 11, 2011

(65) Prior Publication Data

US 2012/0210262 A1    Aug. 16, 2012

Related U.S. Application Data

(60) Provisional application No. 61/443,374, filed on Feb. 16, 2011.

(51) Int. Cl.
*G06F 3/048* (2013.01)
*G06T 13/20* (2011.01)

(52) U.S. Cl.
CPC ............ *G06T 13/20* (2013.01); *G06T 2200/24* (2013.01)
USPC .......................................... 715/763; 715/765

(58) Field of Classification Search
USPC ................................................. 715/763, 765
See application file for complete search history.

(56) References Cited

U.S. PATENT DOCUMENTS

| | | | |
|---|---|---|---|
| 5,146,557 A | 9/1992 | Yamrom et al. | |
| 5,842,180 A | 11/1998 | Khanna et al. | |
| 5,956,031 A | 9/1999 | Berteig et al. | |
| 6,057,837 A | 5/2000 | Hatakeda et al. | |
| 6,414,684 B1 * | 7/2002 | Mochizuki et al. | 345/473 |
| 6,466,214 B1 * | 10/2002 | Sheasby et al. | 345/473 |
| 6,486,893 B1 * | 11/2002 | Ramchandani et al. | 715/762 |
| 6,507,658 B1 | 1/2003 | Abel et al. | |
| 6,654,031 B1 | 11/2003 | Ito et al. | |
| 6,850,254 B1 | 2/2005 | Banning et al. | |
| 6,867,785 B2 | 3/2005 | Smith | |
| 6,922,816 B1 | 7/2005 | Amin et al. | |
| 6,988,241 B1 | 1/2006 | Guttman et al. | |
| 7,039,876 B2 | 5/2006 | Lavendel et al. | |
| 7,092,542 B2 | 8/2006 | McGrath | |
| 7,221,379 B2 | 5/2007 | Mullins et al. | |
| 7,383,509 B2 | 6/2008 | Foote et al. | |
| 7,548,791 B1 | 6/2009 | Johnston | |
| 7,549,123 B1 | 6/2009 | Stewart et al. | |
| 7,653,550 B2 | 1/2010 | Schulz | |

(Continued)

OTHER PUBLICATIONS

U.S. Appl. No. 13/151,181, filed Jun. 1, 2011, Eppolito, Aaron M.

(Continued)

*Primary Examiner* — Omar Abdul-Ali
(74) *Attorney, Agent, or Firm* — Adeli LLP

(57) ABSTRACT

A media editing application is provided that enables an author-user to create a rig graphically. A rig includes a group of snapshots of one or more parameters at different instances of time. A rig is created by selecting one or more objects and creating snapshots of one or more parameters of the selected objects to create an effect. In some embodiments animation is added to some of the snapshots. Some embodiments provide an edit mode where all parameters that are changed during the edit mode are automatically added to the current snapshot at the end of editing mode.

23 Claims, 19 Drawing Sheets

(56) References Cited

U.S. PATENT DOCUMENTS

| | | | |
|---|---|---|---|
| 7,653,880 B2 * | 1/2010 | Peters et al. | 715/762 |
| 7,698,009 B2 | 4/2010 | Cotey et al. | |
| 7,756,281 B2 | 7/2010 | Goldstein et al. | |
| 7,814,426 B2 * | 10/2010 | Huesken et al. | 715/762 |
| 7,823,075 B2 * | 10/2010 | Suzuki et al. | 715/762 |
| 7,873,917 B2 | 1/2011 | Brinkmann et al. | |
| 7,932,909 B2 * | 4/2011 | Niles et al. | 345/474 |
| 7,957,547 B2 | 6/2011 | Chin | |
| 8,132,115 B2 | 3/2012 | Beltran et al. | |
| 8,249,283 B2 | 8/2012 | Ando et al. | |
| 8,484,557 B1 * | 7/2013 | Cheng | 715/249 |
| 8,484,571 B2 * | 7/2013 | Bonuso et al. | 715/764 |
| 2002/0177967 A1 | 11/2002 | Fuchs et al. | |
| 2002/0190991 A1 | 12/2002 | Efran et al. | |
| 2003/0039408 A1 | 2/2003 | Smith | |
| 2004/0066396 A1 | 4/2004 | Hatakenaka | |
| 2006/0066628 A1 * | 3/2006 | Brodie et al. | 345/594 |
| 2007/0287490 A1 | 12/2007 | Green et al. | |
| 2008/0002844 A1 | 1/2008 | Chin | |
| 2008/0232617 A1 | 9/2008 | Goodwin et al. | |
| 2008/0253577 A1 | 10/2008 | Eppolito | |
| 2008/0253592 A1 | 10/2008 | Sanders et al. | |
| 2009/0091563 A1 | 4/2009 | Viz et al. | |
| 2009/0129601 A1 | 5/2009 | Ojala et al. | |
| 2009/0144063 A1 | 6/2009 | Beack et al. | |
| 2010/0157726 A1 | 6/2010 | Ando et al. | |
| 2010/0170758 A1 | 7/2010 | Chen | |
| 2010/0189266 A1 | 7/2010 | Oh et al. | |
| 2010/0199204 A1 | 8/2010 | Oh et al. | |
| 2011/0007915 A1 | 1/2011 | Park | |
| 2011/0145743 A1 | 6/2011 | Brinkmann et al. | |
| 2012/0207309 A1 | 8/2012 | Eppolito | |
| 2012/0210223 A1 | 8/2012 | Eppolito | |

OTHER PUBLICATIONS

U.S. Appl. No. 13/151,199, filed Jun. 1, 2011, Eppolito, Aaron M.
Portions of prosecution history of U.S. Appl. No. 11/271,081, filed Dec. 10, 2010, Brinkmann, Ron, et al.
Author Unknown, "Additional Presets," Month Unknown, 2007, pp. 1-2, iZotope, Inc.
Author Unknown, "Octogris by UDM," Month Unknown, 2000-2011, pp. 1-3, KVR Audio Plugin Resources.
Author Unknown, "PCM 81 Presets," Month Unknown, 1989, Lexicon, Bedford Massachusetts, USA.
Author Unknown, "Spectron—64-bit Special Effect Processor," Month Unknown, 2007, pp. 1-3, iZotope, Inc.
Lee, Taejin, et al., "A Personalized Preset-Based Audio System for Interactive Service," Audio Engineering Society (AES) 121$^{st}$ Convention, Oct. 5-8, 2006, pp. 1-6, San Francisco, CA, USA.
Portions of prosecution history of U.S. Appl. No. 12/972,416, filed Mar. 21, 2014, Brinkmann, Ron, et al.
Author Unknown, "Using Adobe Premiere Elements 8 Editor," last updated Aug. 12, 2010, pp. 146-167, Adobe Systems Incorporated, San Jose, California, USA.
Author Unknown, "Adobe Premiere Pro CS3: User Guide," Apr. 1, 2008, pp. 240-278, Adobe Systems Incorporated, San Jose, California, USA.

* cited by examiner

RIGGING PARAMETERS TO CREATE EFFECTS AND ANIMATION

CLAIM OF BENEFIT TO PRIOR APPLICATIONS

The present application claims the benefit of U.S. Provisional Patent Application 61/443,374, entitled, "Rigging Parameters to Create Effects and Animation," filed Feb. 16, 2011. The contents of U.S. Provisional application 61/443,374 are hereby incorporated by reference.

BACKGROUND

Many computer applications include a graphical user interface that has user adjustable parameters. These parameters are often adjustable without regard to other parameters. They can be adjusted despite the fact that an adjustment to one parameter may make an adjustment to a second parameter desirable or necessary. For instance, a graphical user interface may allow a user to make adjustments to large numbers of parameters. These parameters could include locations, orientations, colors, and effects. The user may set each parameter independently which could take a great deal of time.

Rigging is a way of using one or more parameters to manipulate a larger set of parameters. In the past, an association of the parameters was defined in a rig by complex mathematical expressions. For instance, the author-user selected a first parameter, selected or defined a mathematical relationship that tied the values of the first parameter to a second parameter. Thus, an author-user had to use mathematical expressions to create a rig. An end-user used the created rig to manipulate the larger set of parameters by manipulating the fewer parameters in the rig.

However, using a mathematical formula to tie parameters is complex and at times not easy to implement. The problem becomes even worse when more than two variables are related to each other. For example, in a computer application that creates effects and animation between several graphical objects, implementing an effect may require associating the values of several parameters from one or more objects together. Devising a mathematical formula to define the relationship among many different parameters would be complex and time consuming if not impossible to implement.

BRIEF SUMMARY

Some embodiments provide a media editing application that enables an author-user to create a rig graphically. A rig is created in some embodiments by creating an inspector canvas in the media editing application and bringing a graphical object into the canvas. The object is brought into the canvas by dragging and dropping into a location in the canvas or by selecting an item in a contextual menu. The author-user then selects a control (e.g., a slider, a radio button, or a pop-up object) for the rig. The author-user then selects one or more parameters of the object to rig. The current values of the selected parameters of the object are associated with a current value of the control parameter (e.g., with a particular position of a slider control). In this way a snapshot of the values of the parameters is created. Another snapshot can be created by changing the properties of the object and rigging them to another value of the control parameter. In this manner, the author-user is able to create a rig without using complex mathematical expressions. More than one object can be selected and one or more parameters of each object can be rigged to a particular value of a control parameter. In some embodiments, the media editing application allows a default set of parameters to be rigged to a particular value of a control parameter and the author-user can add or delete the number of parameters to rig. In some embodiments, while in an edit mode, parameters that are changed are added to a selected rig and the values of these parameters are directly added to the current snapshot of the rig.

An end-user manipulates the parameters by manipulating the control parameter in the rig. A rig can be presented to the end-user in a number of different formats. A Boolean or checkbox rig provides two snapshots for the end-user to choose from. The chosen snapshot will set the values of the parameters of the object(s) to those associated with the snapshot. A pop-up rig provides a pop-up window with a field that the end-user can select from a number of snapshots. A slider rig provides a knob that the end-user can slide in order to manipulate the representative parameter. The pop up and slider rigs have multiple snapshots. If the user slides a slider rig to a value that is not exactly a snapshot value, the values of the parameters associated with this value are interpolated from the values of the parameters associated with the neighboring snapshot values.

A decision as to which kind of rig to use to present snapshots can be based on the properties of the object. For instance, a choice between raining and no-rain effects can be presented through a Boolean rig whereas effects related to four seasons can be presented through a pop-up rig. A slider rig could better provide color temperatures to select from.

Each snapshot in a rig can have an animation (or animated object). That is, the representative parameter of the rig is associated with the properties of the animation. In some embodiments, values for different display aspect ratios are converted into snapshots in a rig. The user by choosing a snapshot can modify the aspect ratio parameters and change the aspect ratio of the video.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
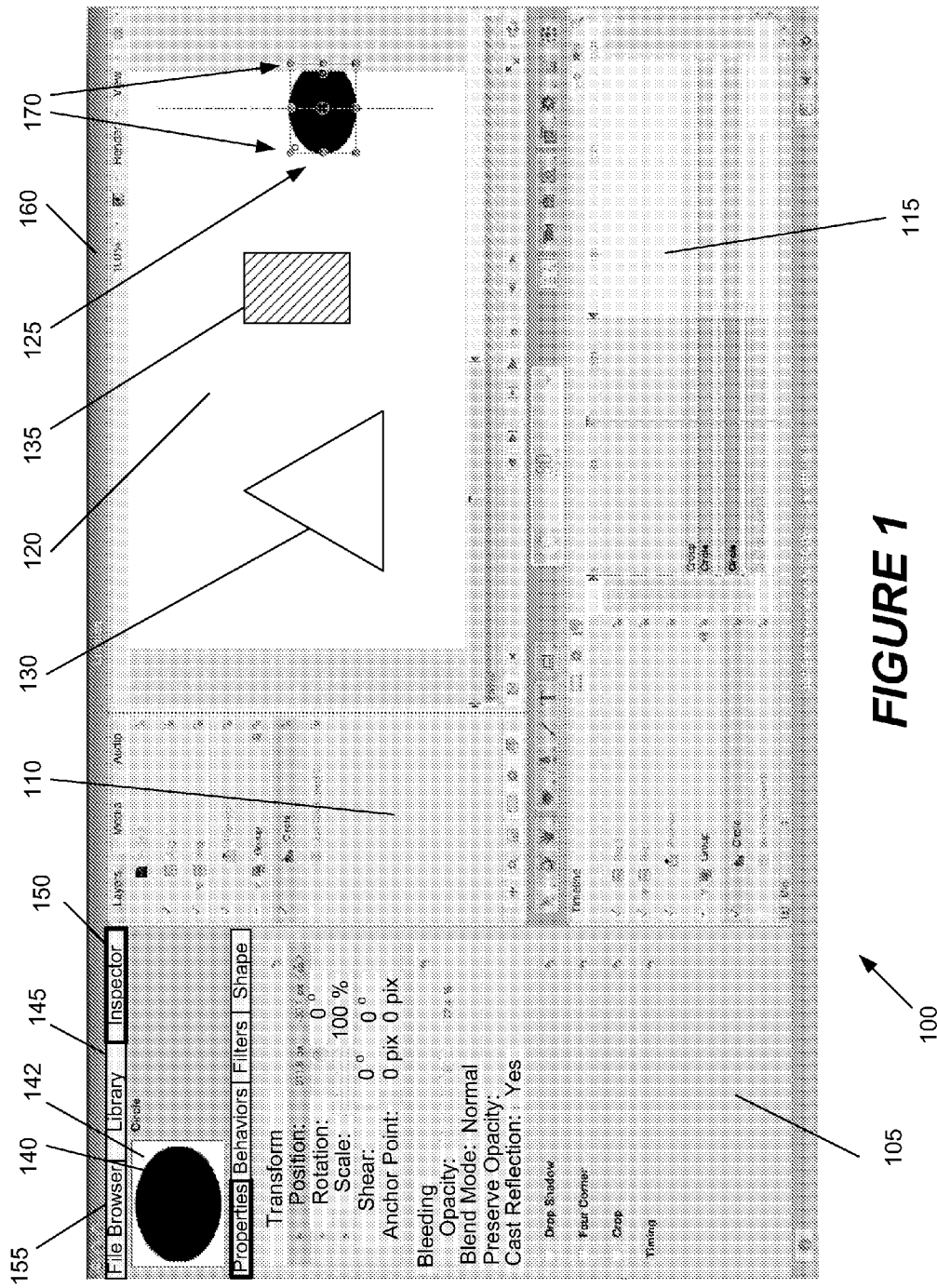
FIG. 1 conceptually illustrates an example of a graphical user interface (GUI) for rigging parameters of objects in some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a media editing application that enables an author-user to create a rig graphically. A rig is created in some embodiments by creating an inspector canvas in the media editing application and bringing a graphical object into the canvas. The object is brought into the canvas by dragging and dropping into a location in the canvas or by selecting an item in a contextual menu. The author-user then selects a control (e.g., a slider, a radio button, or a pop-up object) for the rig. The author-user then selects one or more parameters of the object to rig. The current values of the selected parameters of the object are associated with a current value of the control parameter (e.g., with a particular position of a slider control). In this way a snapshot of the values of the parameters is created. Another snapshot can be created by changing the properties of the object and rigging them to another value of the control parameter. In this manner, the author-user is able to create a rig without using complex mathematical expressions. More than one object can be selected and one or more parameters of each object can be rigged to a particular value of a control parameter. In some embodiments, the media editing application allows a default set of parameters to be rigged to a particular value of a control parameter and the author-user can add or delete the number of parameters to rig. In some embodiments, while in an edit mode, parameters that are changed are added to a selected rig and the values of these parameters are directly added to the current snapshot of the rig.

An end-user manipulates the parameters by manipulating the control parameter in the rig. A rig can be presented to the end-user in a number of different formats. A Boolean or checkbox rig provides two snapshots for the end-user to choose from. The chosen snapshot will set the values of the parameters of the object(s) to those associated with the snapshot. A pop-up rig provides a pop-up window with a field that the end-user can type in a value for the representative parameter. A slider rig provides a knob that the end-user can slide in order to manipulate the representative parameter. The pop up and slider rigs have multiple snapshots. If the user types in or slides to a value that is not exactly a snapshot value, the values of the parameters associated with the value that is typed in/slid to are interpolated from the values of the parameters associated with the neighboring snapshot values.

A decision as to which kind of rig to use to present snapshots can be based on the properties of the object. For example, a choice between raining effects or no-rain can be presented through a Boolean rig whereas effects related to four seasons can be presented through a pop-up rig. A slider rig could better provide color temperatures to select from.

Each snapshot in a rig can have an animation (or animated object). That is, the representative parameter of the rig is associated with the properties of the animation. In some embodiments, values for different display aspect ratios are converted into snapshots in a rig. The user by choosing a snapshot can modify the aspect ratio parameters and change the aspect ratio of the video.

Several more detailed embodiments of the invention are described in sections below. Section I provides an overview of rigging and describes a graphical user interface used in some embodiments. Next, Section II describes rigging parameters to generate effects in some embodiments. Section III describes the software architecture of some embodiments. Finally, a description of an electronic system with which some embodiments of the invention are implemented is provided in Section IV.

I. Overview

A. Graphical User Interface

FIG. 1 conceptually illustrates an example of a graphical user interface (GUI) 100 of a media editing application for rigging parameters of objects in some embodiments. Different portions of this graphical user interface are used in the following sections to provide examples of the methods and systems of some embodiments. However, the invention may be practiced without some of the specific details and examples discussed. One of ordinary skill in the art will recognize that the graphical user interface 100 is only one of many possible GUIs for such a media editing application. In fact, the GUI 100 includes several display areas which may be adjusted in size, opened or closed, replaced with other display areas, etc. As shown, the GUI includes a utility window 105, a project pane 110, a timing pane 115, a toolbar 160, and a canvas 120. The utility window 105 includes a preview area 142, a file browser 155, library 145 that includes one or more libraries for saving and retrieving different objects and effects, and an inspector 150 where individual setting of the effects are manipulated. The utility window 105 allows locating, organizing, and modifying of the media, effects, and parameters that are used in a user's project.

The canvas 120 is the main work area of the GUI where different elements are viewed and manipulated. As shown in the example of FIG. 1, three objects 125, 130, and 135 are currently displayed on the canvas. Furthermore, the currently selected object 125 (as indicated by the handles 170 around it) is also displayed (as object 140) in the preview area 142 of the utility window 105.

The project pane 110 includes controls that allow a user to see and manipulate the contents of the user's project. The project pane 110 in some embodiments can be hidden to increase the canvas 120 working area. The toolbar 160 includes controls to create and edit different elements of a user's project. In some embodiments different tools or groups of tools can be shown on the toolbar at different times. The timing pane 115 includes different controls that allow the user to see and manipulate different aspects of a user's project with an emphasis on how different elements are arranged in time.

In some embodiments, a project file is created to include the shapes, masks, and text objects that a user creates. The project file indicates how a particular composition is assembled, what media files are used, and what effects from the library are applied.

B. Creating Rigs by Generating Snapshots

Figure 2:
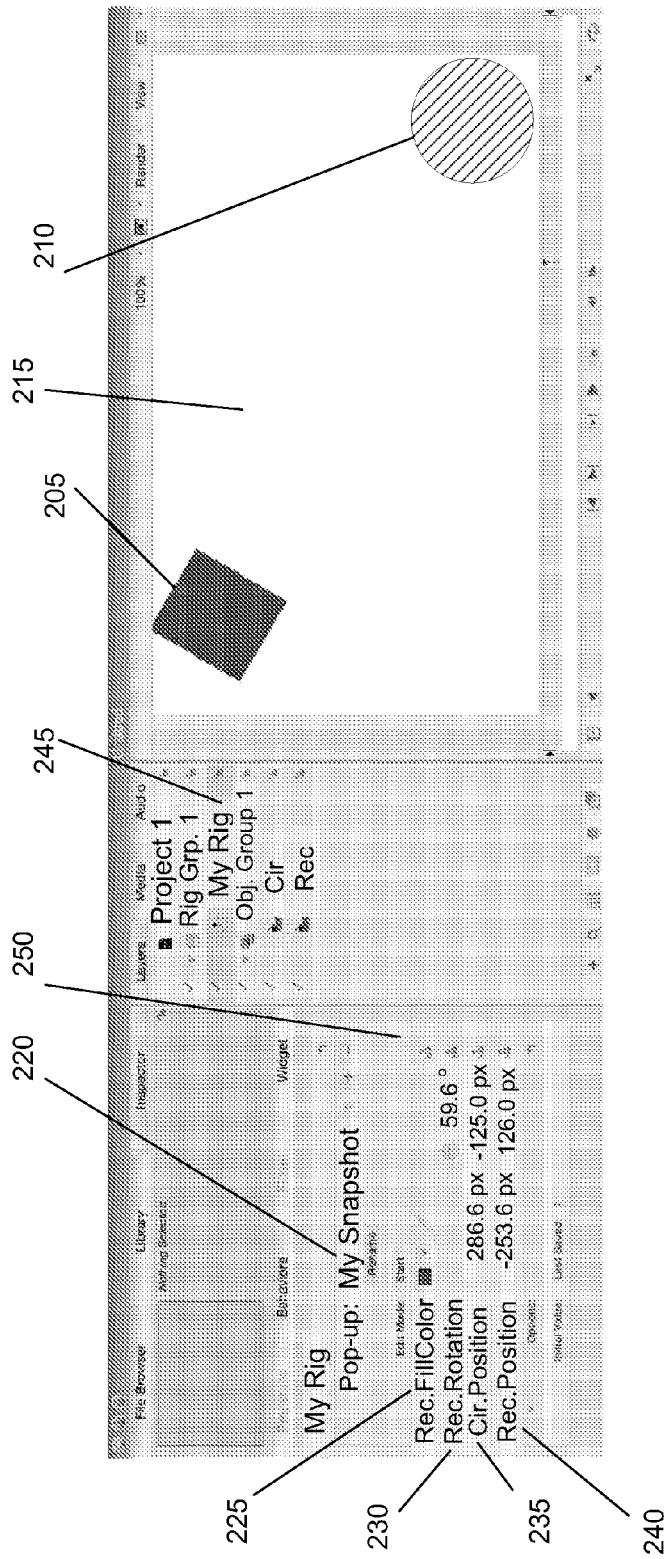
FIG. 2 conceptually illustrates a portion of a GUI with a rig and a snapshot in some embodiments.

Some embodiments create effects and animation by setting values of different parameters of one or more objects at desired values and saving snapshots of the values for later use. Each snapshot is tied to one value (or one state) of a rig control. FIG. 2 conceptually illustrates a portion 200 of a GUI of the media editing application of some embodiments. Two objects, a rectangle 205 and a circle 210 are displayed on the canvas 215 in the GUI. As shown, a snapshot 220 called "My snapshot" is created that rigs three parameters (fill color 225, rotation 230, position 240) of the rectangle and one parameter (position 235) of the circle. The snapshot is saved in a rig 245 called "My Rig". The details of the snapshot values are shown in the utility window 250.

Figure 3:
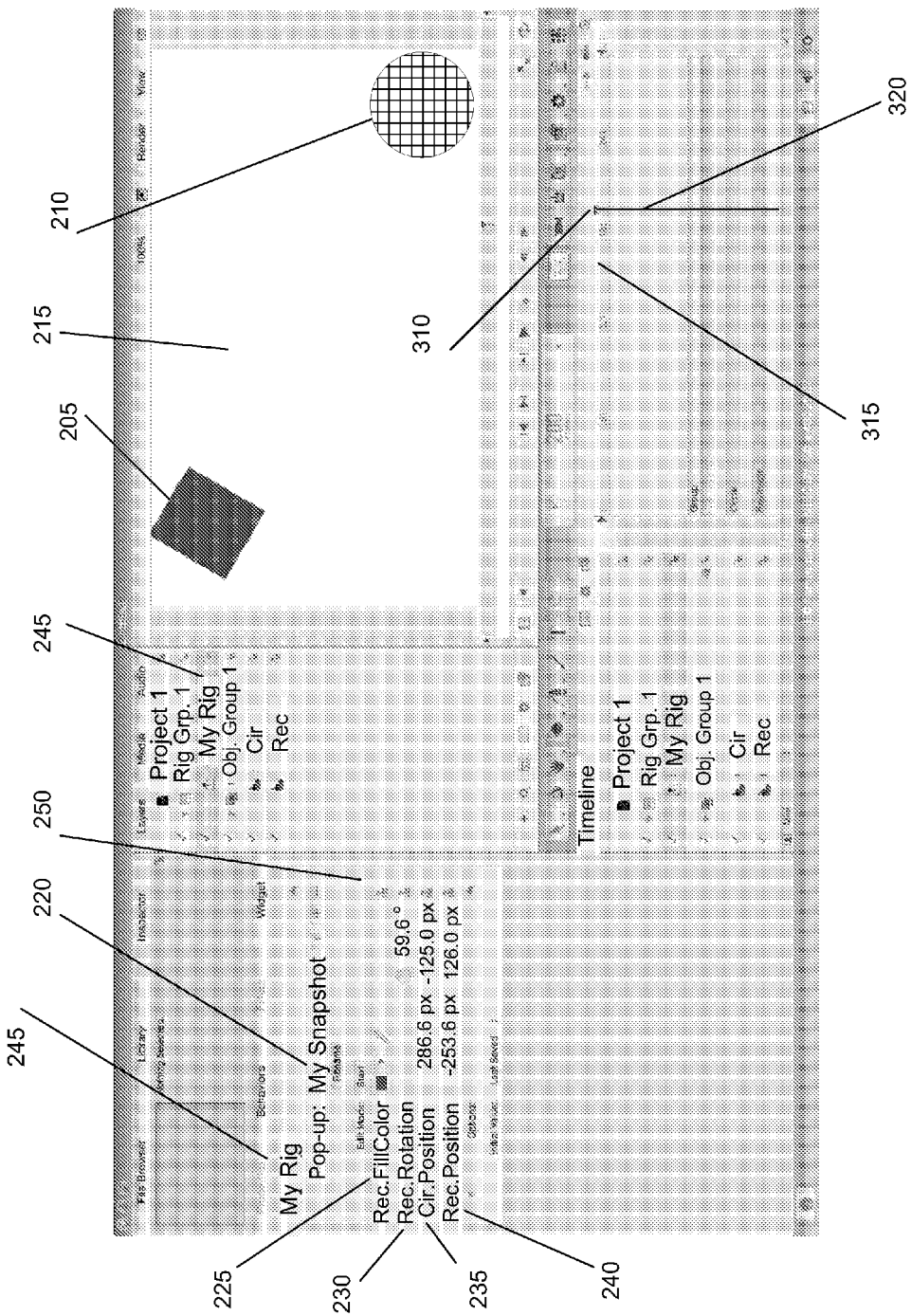
FIG. 3 conceptually illustrates a portion of a GUI of some embodiments in which the values of parameters associated with a rig are set to values of a particular snapshot in the rig.

Other parameters of the two objects (e.g., the circle fill color) are not included in the rig. At any time after the creation of the rig, when the snapshot is activated, the rigged parameters of the two objects are set to the values saved in "My snapshot". FIG. 3 conceptually illustrates a portion of a GUI of the media editing application of some embodiments in which the values of parameters associated with a rig are set to values of a particular snapshot in the rig in order to create a certain effect. In this figure, prior to displaying the video sequence, a particular point 310 in time on the timeline 315 has been associated with the snapshot 245. For instance, a user in some embodiments makes such association prior to the start of a video sequence by placing a keyframe at time 310 and associating the keyframe with the snapshot 220.

During the video display, once the display time reaches time 310 (as shown in FIG. 3 and indicated by the line 320 which shows the progress of time during the display of a video sequence), the rigged values saved in the snapshot 220 are applied to the rigged parameters of objects 205 and 210. The parameters that are not rigged are not changed. For instance, the value of the fill color 225, rotation 230, and position 240 of the rectangle 205 and the position 235 of the circle 210 are set to the values saved in the snapshot (same values as shown in FIG. 2). However, the fill color of the circle which was not rigged, maintains its value prior to applying the rig. As such, after applying the snapshot values, the circle fill color in FIG. 3 is not the same as the circle fill color when the snapshot was created and saved (as shown in FIG. 2). More details of generating and using rigs are defined in the following sections. As described in further detail by reference to FIG. 18, below, some embodiments include animation to one or more rigs or snapshots. In these embodiments, for each animation, several keyframes similar to keyframe 310 are placed on the timeline 315 to identify different points of time during animation (e.g., start time, end time, and any required intermediate points).

Figure 4:
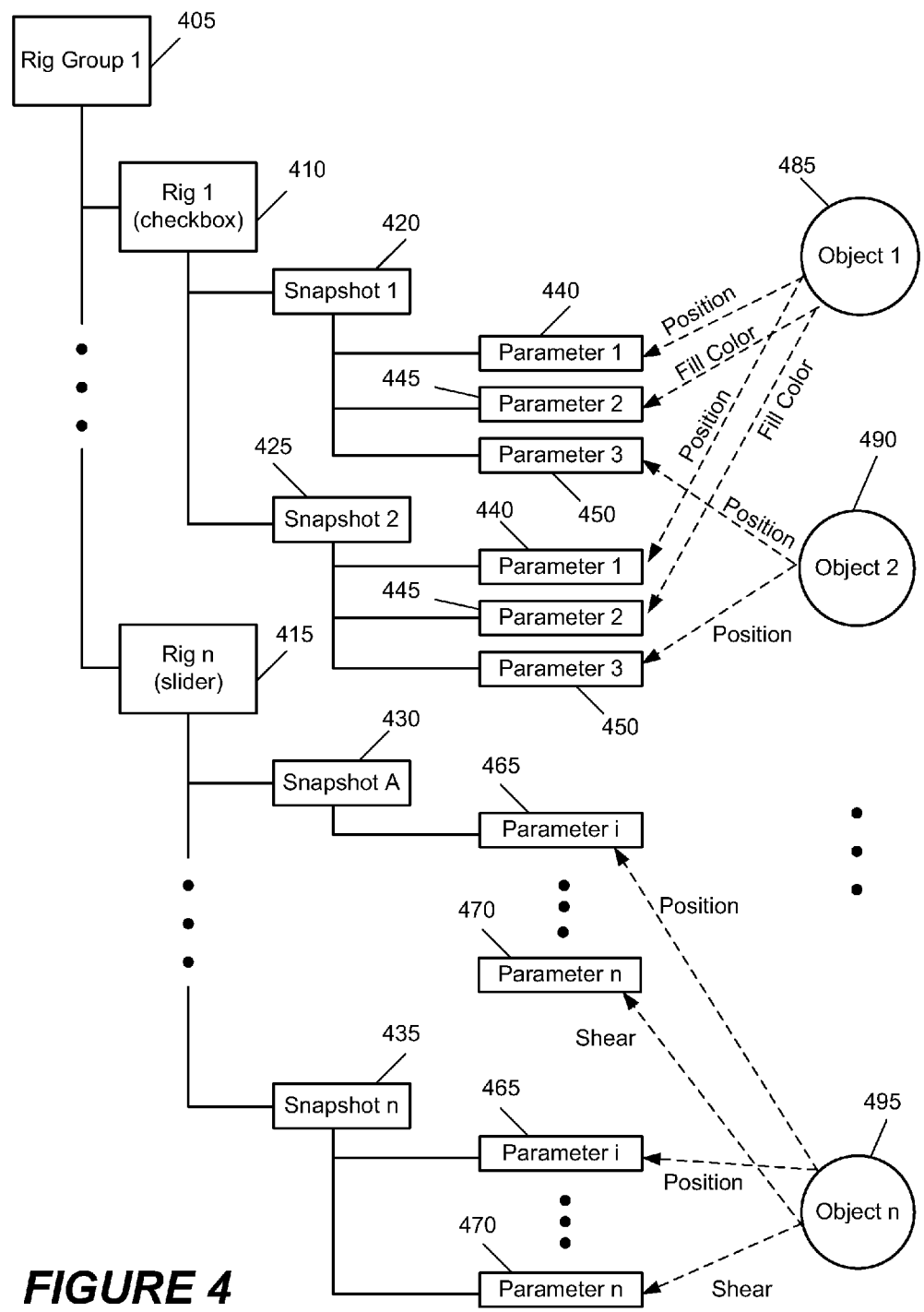
FIG. 4 conceptually illustrates an example of a rig hierarchy in some embodiments.

FIG. 4 conceptually illustrates an example of a rig hierarchy in some embodiments. As shown, Rig Group 1 405 includes n rigs. Rig 1 410 is a checkbox type rig and Rig n 415 is a slider type rig. Different types of rigs are described in more detail further below. Rig 1 410 includes two snapshots 420-425. Each snapshot 420-425 rigs values of three parameters 440-450 from two objects 485-490. In the example shown, these parameters are position and fill color of object 1 485 and position of object 2 490. Each snapshot stores a set of values for the rigged parameters.

Rig n 415 includes n snapshots 430-435. Each snapshot corresponds to a particular location on the slider control. Each snapshot in this rig rigs several parameters 465-470 of one object. The rigged parameters are position and shear parameters of object n 495. As shown in FIG. 4, different number of snapshots and different number of parameters from one or more objects can be rigged together to generate desired effects.

II. Rigging Parameters to Create Effects

In some embodiments, an author-user creates effects and associates the parameters of the effects with a few parameters in a rig. The created rig is published and the end user uses the rig. As such, the author-user can hide some parameters by picking and choosing the parameters that the author-user wishes to expose to the end-user.

In some embodiments, a rig is created by creating several snapshots of the values of the rigged parameters. Each snapshot is created by selecting a group of parameters associated with one or more objects and saving the values of the objects.

A. Creating Rigs and Groups of Rigs

Figure 5:
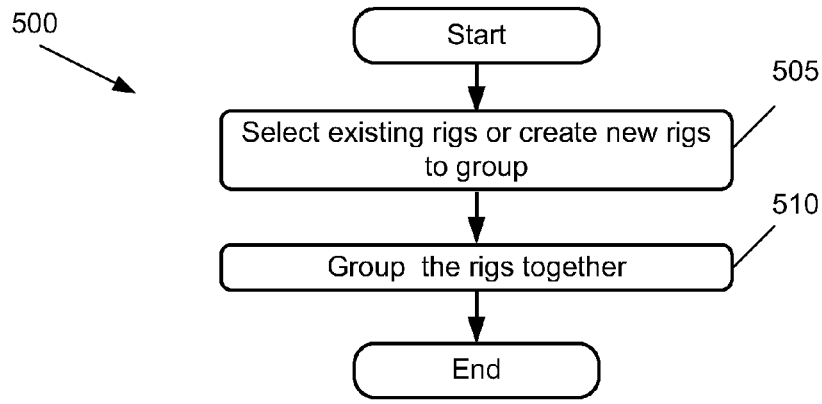
FIG. 5 conceptually illustrates a process for creating a group of rigs in some embodiments.

FIG. 5 conceptually illustrates a process for creating a group of rigs in some embodiments. As shown, the process selects (at 505) several existing rigs or creates news rigs to group. The process then groups (at 510) the rigs together. The process then exits. More details of generating groups of rigs are described further below.

Figure 6:
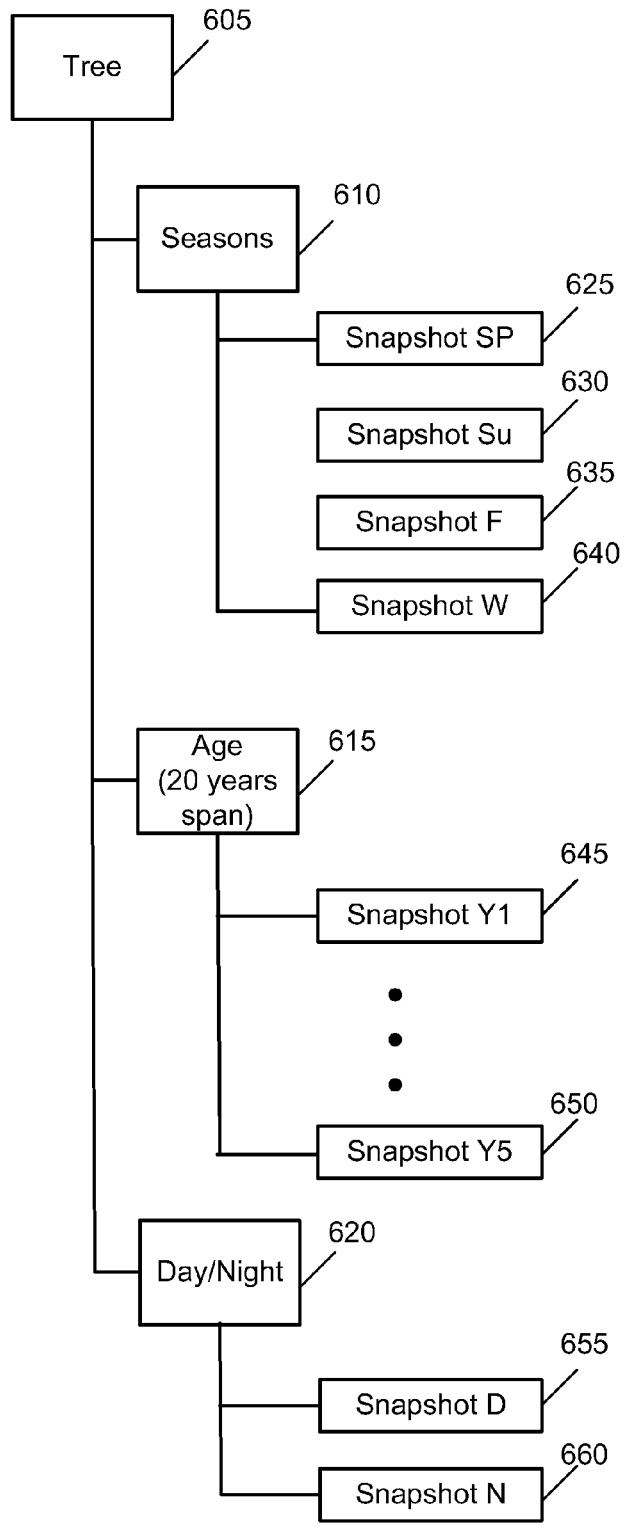
FIG. 6 conceptually illustrates a rig group to create effects for a tree object.

A group of rigs is useful for projects that require several rigs to create the desired effects and animation. For instance, for an object like a tree, one rig with four snapshots might create the effects of four seasons. Another rig with several snapshots might create the effects of growth and aging. Yet another rig with two snapshots might create the effects for day and night or different light conditions. FIG. 6 conceptually illustrates a rig group 605 to create these effects for a tree object. As shown, the rig group 605 includes three rigs 610-620. Rig 610 includes four snapshots 625-640 to create effects for each of the four seasons.

Rig 615 includes five snapshots 645-650 to create the effects of 20 years of growth and aging. Since there are only five snapshots in this rig, some embodiments interpolate or extrapolate the snapshot values to generate the "in between" values. For instance, when the snapshots are taken for years 1, 5, 7, 8, and 15, the parameters values for the other years are interpolated or extrapolated from the values saved in the snapshots. Finally, rig 620 includes two snapshots to create the effects for day and night (e.g., by rigging parameters for color fill, gradient, etc. to change the light condition for the tree object).

Figure 7:
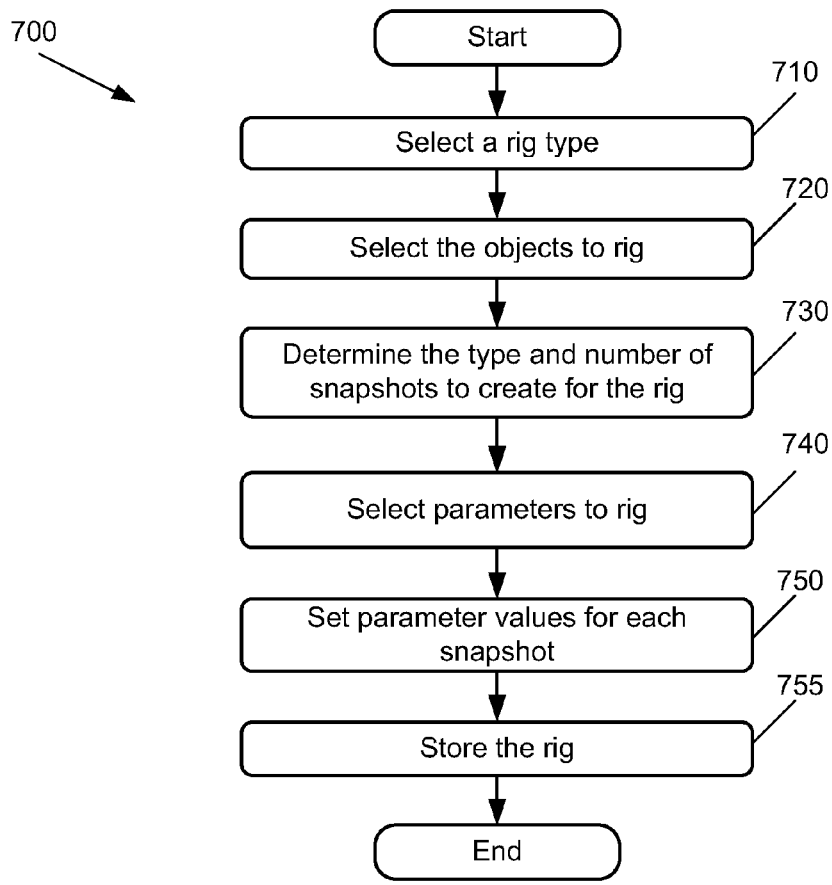
FIG. 7 conceptually illustrates a process for creating a rig in some embodiments.
Figure 8:
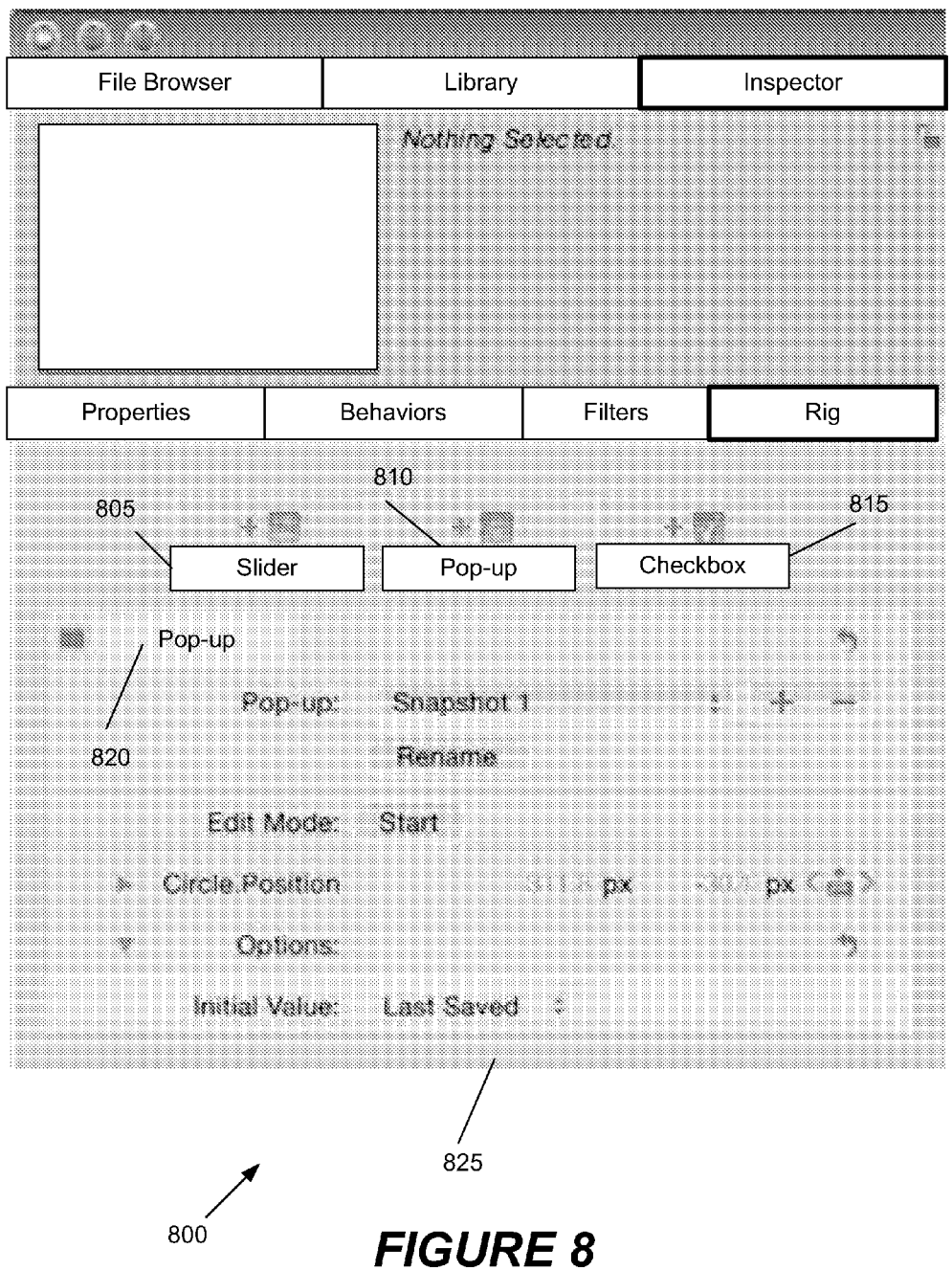
FIG. 8 conceptually illustrates a portion of a GUI with several different rig types in some embodiments.

FIG. 7 conceptually illustrates a process 700 for creating a rig in some embodiments. As shown, process 700 selects (at 710) a rig type. Some embodiments provide several different types of rigs such as slider, pop-up, radio. FIG. 8 conceptually illustrates a portion 800 of a GUI of the media editing application of some embodiments with several different rig types. As shown, the GUI allows creation and selection of several types of rigs such as slider 805, pop-up 810, and checkbox 815. A pop-up rig 820 is currently displayed in a portion of the utility window 825.

A checkbox type rig includes two values (or states), namely checked and unchecked values. A slider type rig is controlled by a slider. Each position along the slider path corresponds to a set of values in a snapshot. In some embodiments, when the slider is in a position for which no snapshot was taken, the values of the parameters for the closest two snapshots are interpolated (or extrapolated) for creating a smooth transition. In other embodiments, no interpolation or extrapolations are used and the values of the parameters are held between the two states. A pop-up type rig is controlled by a pop-up menu that shows different snapshots of the rig. In some embodiments, the pop-up and slider type rigs include a user selectable number of parameters. In some embodiments, once a rig type is selected, process 700 creates a rig object with a default name. Process 700 optionally receives a user-defined name for the rig object.

Referring back to FIG. 7, process 700 next selects (at 720) one or more objects to rig. Some embodiments provide different methods of selecting an object. Objects are selected through the canvas, the project list, etc. For instance, an object is selected by dragging and dropping into a location in the canvas or by selecting an item in a contextual menu. In some embodiments the selection is received through a user selection input such as input received from a cursor controller (e.g., a mouse, touchpad, trackpad, etc.), from a touchscreen (e.g., a user touching a user interface (UI) item on a touchscreen), from the keyboard, etc. The term user selection input is used throughout this specification to refer to at least one of the preceding ways of making a selection, moving a control, or pressing a button through a user interface.

Next, the process determines (at 730) the type and number of snapshots to create the rig. As shown in reference to FIG. 4 above, each particular effect requires a certain number of snapshots to create the desired effect. Next, the process selects (at 740) the required parameters to rig in order to create the desired effect. For instance, to create the effects of day and night lightings, a certain number of parameters for color and gradient might be required. The process then sets (at 750) rigged parameters values for each snapshot. In some embodiments, the values of parameters are received by process 700 when a user changes the values of the rigged parameters (e.g., a rigged position parameter changes when the user moves an object around in the canvas). Values of the rigged parameters are adjusted from anywhere in the media editing application once a snapshot is selected. For instance, in some embodiments the values of parameters are modified through the rig's inspector, by manipulating the object in the canvas, by using selections in different menus, etc. Finally, the process stores (at 755) the rig and its associated snapshots. The process then exits.

One of ordinary skill in the art will recognize that process 700 is a conceptual representation of the operations used for creating a rig. The specific operations of process 700 may not be performed in the exact order shown and described. The specific operations may not be performed in one continuous series of operations, and different specific operations may be performed in different embodiments. Furthermore, the process could be implemented using several sub-processes, or as part of a larger macro process.

Figure 9:
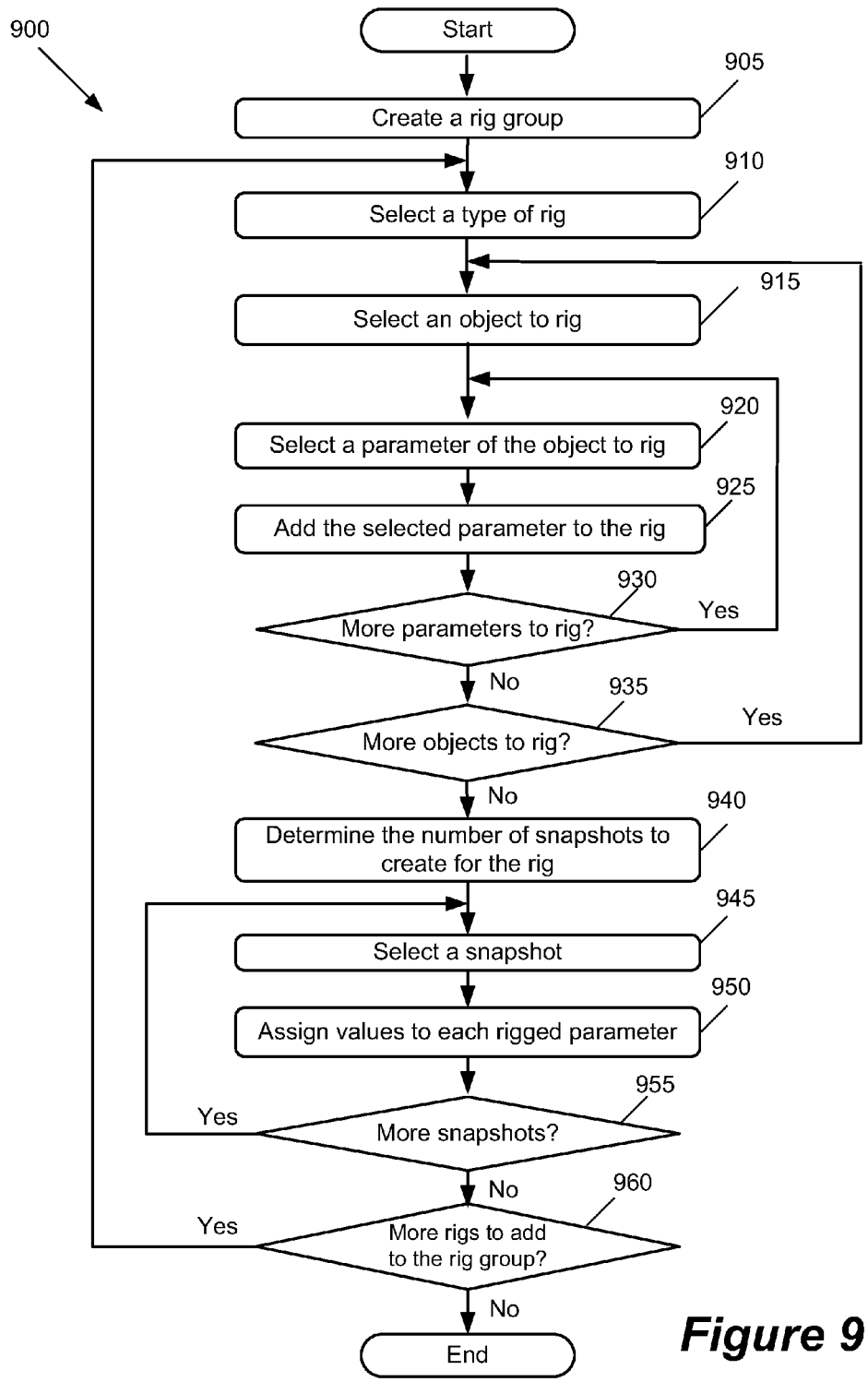
FIG. 9 conceptually illustrates a process for rigging parameters using rigs and rig groups in some embodiments.

A more detailed process for creation of rigs and groups of rigs is described by reference to FIG. 9. FIG. 9 conceptually illustrates a process 900 for rigging parameters using rigs and rig groups in some embodiments. As shown, the process creates (at 905) a rig group. In some embodiments, creating a rig group includes creating an empty object for the rig group. In other embodiments, a rig group is only created when two or more existing rigs are associated together to create a rig group. When only one rig is required, some embodiments bypass operation 905. Next, the process creates (at 910) a rig by selecting a rig type (e.g., a slider 805, a pop-up 810, or a checkbox 815 as shown in FIG. 8). In some embodiments, selecting a rig type creates an empty rig of the selected type. In some embodiments, a rig is assigned a default name. Process 900 optionally receives a user-defined name for the created rig.

Next the process selects (at 915) an object for rigging. In some embodiments, an object is selected through a user selection input (e.g., by dragging and dropping the object into a location in the canvas or by selecting an item in a contextual menu). Next, the process selects (at 920) a parameter of the object to rig. In some embodiments, when an object is selected, a list of the object parameters is displayed in the utility window. For instance, FIG. 1 shows that object 125 is selected (as indicated by the handles 170 displayed around the object). As shown, the utility window 105 shows a list of the object parameters (e.g., position, rotation, scale, etc.).

The process then adds (at 925) the selected parameter to the rig. Different embodiments provide one or more different ways of selecting and adding a parameter to a rig. For instance a parameter can be added through a user selection input (e.g., by dragging and dropping into a location in the project panel or by selecting the item in a contextual menu). In some embodiments, once a parameter is added to the rig, any change in the value of the parameter is automatically saved in the rig without any explicit user commands. As described further below, parameters can also be added through edit mode.

Next, the process determines (at 930) whether to add more parameters to the rig. When more parameters are to be added to the rig, the process proceeds to 920 which was described above. Otherwise, the process determines (at 935) whether to add more objects. In some embodiments different parameters from different objects are rigged together. For instance, as described by reference to FIG. 2, three parameters from the rectangle object 205 and one parameter from the circle object 210 are rigged together. When process 900 determines that more objects are needed for the rig, the process proceeds to 915 which was described above.

Otherwise, the process determines (at 940) the number of snapshots for the rig. Different rigs include different number of snapshots. For instance, in some embodiments, a checkbox rig has only two snapshots. One snapshot associated with the checked value (or state) of the checkbox and the other associated with the unchecked value (or state) of the checkbox. In some embodiments, some types of rigs such as slider or pop-up have a default number of snapshot and snapshots can be added or deleted from the default number of snapshots.

The process then selects (at 945) a snapshot (e.g., through a user selection input). The process then assigns (at 950) values to each rigged parameter in the selected snapshot. In some embodiments, a snapshot is automatically updated and saved as the values of the rigged parameters associated to it are updated. The process then determines (at 955) whether more snapshots are required. When more snapshots are required, the process proceeds to 945 which was described above. Otherwise, the process determines (at 960) whether more rigs are to be added to the rig group. When more rigs are to be added, the process proceeds to 910 which was described above. Otherwise, the process ends. When only one rig is required, some embodiments bypass operation 960.

One of ordinary skill in the art will recognize that process 900 is a conceptual representation of the operations used for rigging parameters using rigs and rig groups. The specific operations of process 900 may not be performed in the exact order shown and described. The specific operations may not be performed in one continuous series of operations, and different specific operations may be performed in different embodiments. Furthermore, the process could be implemented using several sub-processes, or as part of a larger macro process.

B. Modifying an Existing Rig

Figure 10:
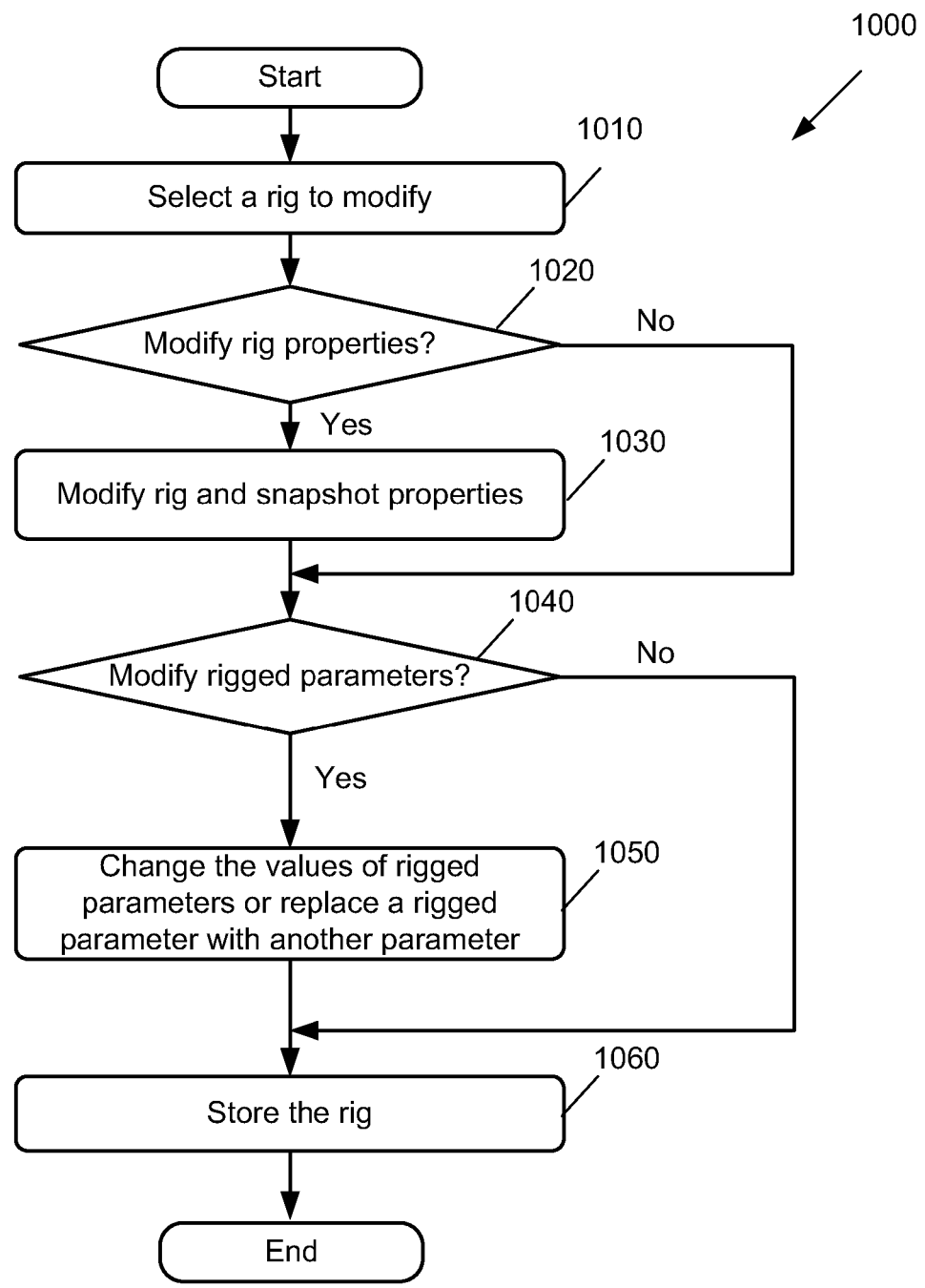
FIG. 10 conceptually illustrates a process for modifying an existing rig in some embodiments.

FIG. 10 conceptually illustrates a process 1000 for modifying an existing rig in some embodiments. As shown, the process selects (at 1010) a rig to modify. Next, the process determines (at 1020) whether the rig properties (e.g. number of snapshots in the rig) are to be modified. When the properties of the rig are not to be modified, the process proceeds to 1040 which is described below. Otherwise, the process modifies (at 1030) the rig (and/or its associated snapshots) properties. Modifying rig properties is described in more detail by reference to FIG. 12 below.

The process then determines (at 1040) whether to modify rigged parameters. When the rigged parameters are not to be modified, the process proceeds to 1060 which is described below. Otherwise, the process changes (at 1050) the values of rigged parameters or replaces a rigged parameter with another parameter. Changing rigged parameters is described in more detail by reference to FIG. 11 below. Next, the process stores (at 1060) the modified rig. The process then ends.

One of ordinary skill in the art will recognize that process 1000 is a conceptual representation of the operations used for modifying an existing rig. The specific operations of process 1000 may not be performed in the exact order shown and described. The specific operations may not be performed in one continuous series of operations, and different specific operations may be performed in different embodiments. Furthermore, the process could be implemented using several sub-processes, or as part of a larger macro process.

Figure 11:
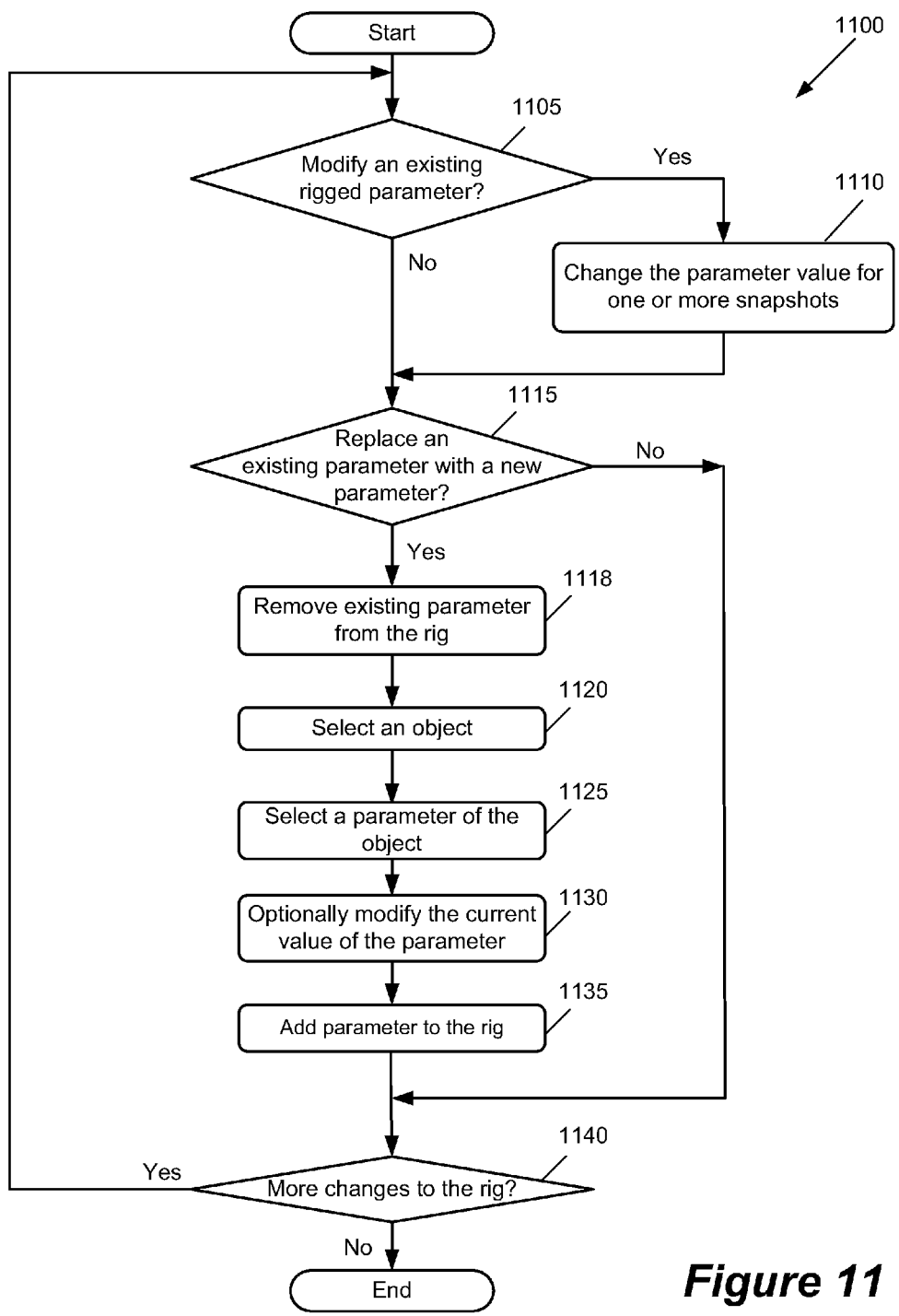
FIG. 11 conceptually illustrates a process for modifying the rigged parameters of a rig in some embodiments.

FIG. 11 conceptually illustrates a process 1100 for modifying the rigged parameters of a rig in some embodiments. As shown, the process determines (at 1105) whether to modify an existing rigged parameter. When an existing parameter is not to be modified, the process proceeds to 1115 which is described below. Otherwise, the process changes (at 1110) the parameter value for one or more snapshots.

The process then determines (at 1115) whether to replace an existing parameter in a rig with a different parameter. When parameters are not to be replaced, the process proceeds to 1140 which is described below. Otherwise, the process removes (at 1118) the existing parameter from the rig. Next, the process selects (at 1120) an object. The process then selects (at 1125) a parameter of the object. The process optionally modifies (at 1130) the current value of the parameter. The process then adds (at 1135) the parameter to the rig.

The process then determines (at 1140) whether more changes are required for the rig. When more changes are required, the process proceeds to 1105 which was described above. Otherwise, the process exits.

One of ordinary skill in the art will recognize that process 1100 is a conceptual representation of the operations used for modifying the rigged parameters of a rig. The specific operations of process 1100 may not be performed in the exact order shown and described. The specific operations may not be performed in one continuous series of operations, and different specific operations may be performed in different embodiments. Furthermore, the process could be implemented using several sub-processes, or as part of a larger macro process.

Figure 12:
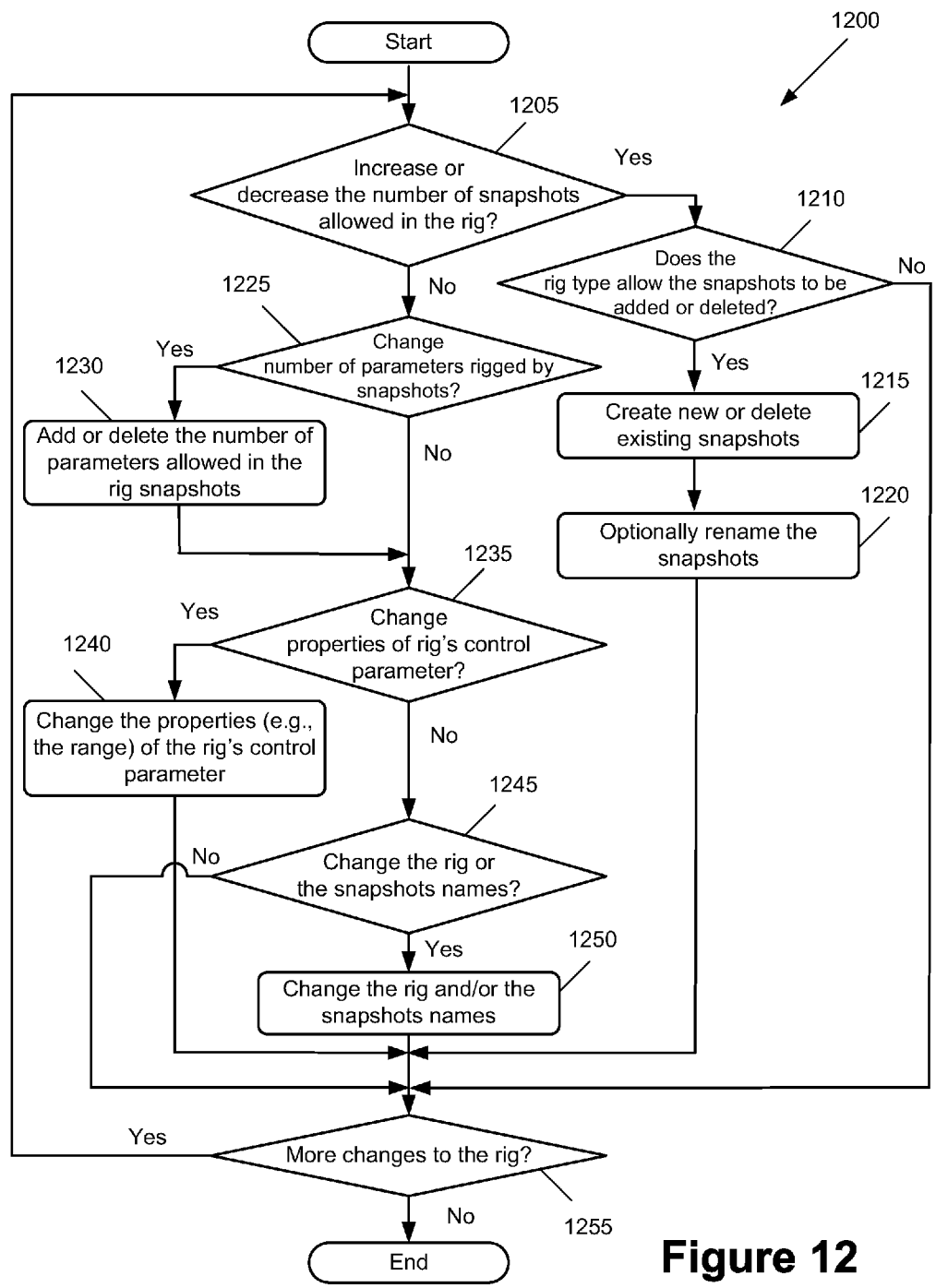
FIG. 12 conceptually illustrates a process for modifying properties of a rig in some embodiments.

FIG. 12 conceptually illustrates a process 1200 for modifying properties of a rig in some embodiments. As shown, the process determines (at 1205) whether the number of snapshots allowed in a rig has to increase or decrease. If the number of snapshots is not to be changed, the process proceeds to 1225 which is described below. Otherwise, the process determines (at 1210) whether the rig type allows the snapshots to be added or deleted.

For instance, in some embodiments a checkbox rig type has two snapshots and does not allow the number of snapshots to increase or decrease. On the other hand pop-up and slider type rigs allow more than two snapshots. When the number of snapshots cannot be changed, the process proceeds to 1255 which is described below. Otherwise, the process creates the new snapshot or deletes the existing snapshots as required. The process also optionally renames (at 1220) the snapshots. The process then proceeds to 1255 which is described below.

When the number of snapshots is not to be changed, the process determines (at 1225) whether to change the number of parameters rigged by snapshots. When the number of parameters rigged is not to be changed, the process proceeds to 1235 which is described below.

Otherwise, the process adds or deletes (at 1230) the number of parameters allowed in the rig snapshots. In some embodiments, all snapshots in a particular rig have the same number of parameters. Next, the process determines (at 1235) whether to change properties of rig's control parameter. When the properties of the control parameter have to be changed, the process changes (at 1240) the properties of the rig's control parameter. For instance, some embodiments allow a user to change the range of a rig control parameter such as a slider. The process then proceeds to 1255 which is described below. When the properties of the control parameter do not have to be changed, the process determines (at 1245) whether to change the rig or any snapshots names. If not, the process proceeds to 1255 which is described below.

Otherwise, the process changes (at 1250) the name of the rig and/or the snapshots. The process then determines (at 1255) whether more changes have to be done to the rig properties. If so, the process proceeds to 1205 which is described above. Otherwise the process exits.

One of ordinary skill in the art will recognize that process 1200 is a conceptual representation of the operations used for modifying properties of a rig in some embodiments. The specific operations of process 1200 may not be performed in the exact order shown and described. The specific operations may not be performed in one continuous series of operations, and different specific operations may be performed in different embodiments. Furthermore, the process could be implemented using several sub-processes, or as part of a larger macro process.

C. Interpolating or Extrapolating Rigged Values

Since the number of snapshots are discrete, some embodiments interpolate or extrapolate the rigged values to fill in the "in between" values for the parameters. For instance, for a slider type rig, a certain number of snapshots are created. For any values "in between" (or outside) the existing values, the values of the nearest snapshots are interpolated or extrapolated to provide a smooth transition.

Figure 13:
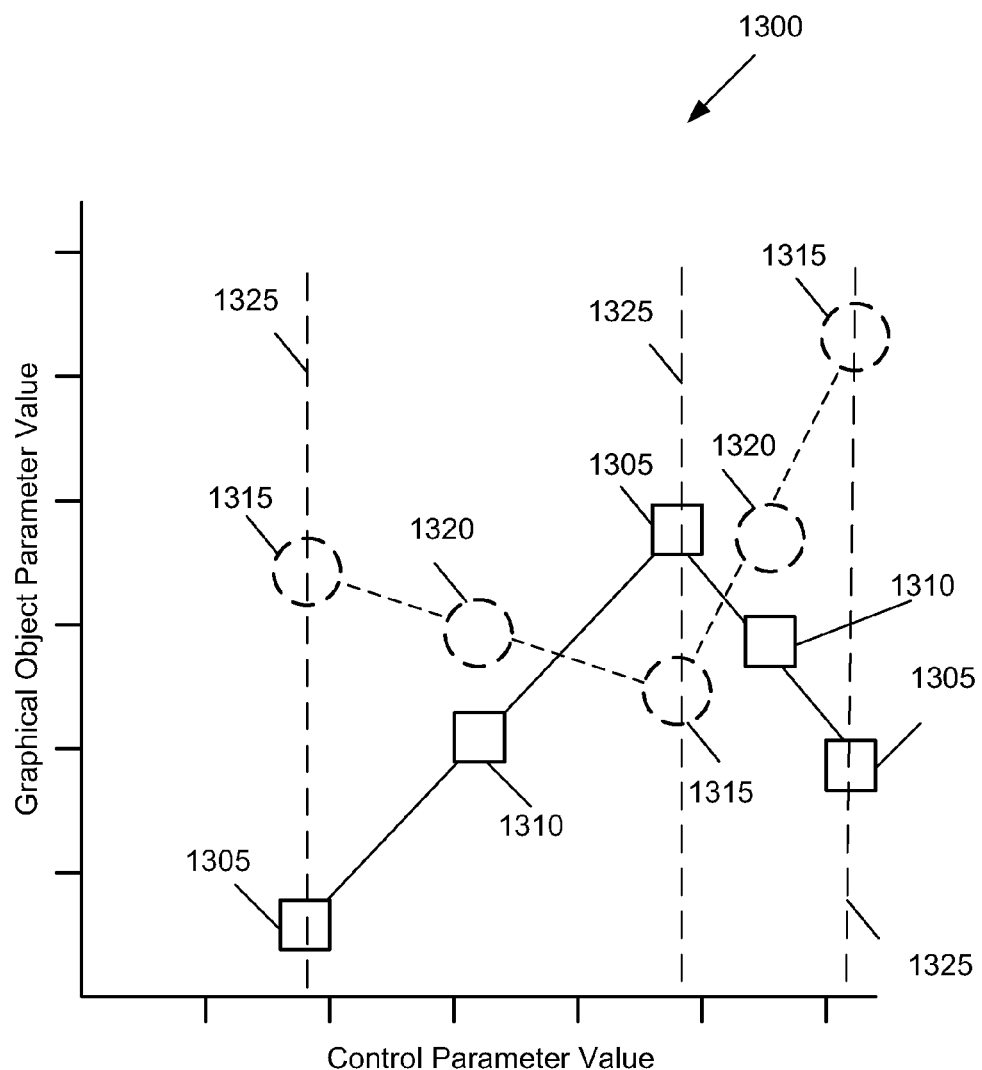
FIG. 13 conceptually illustrates a graph of rigged values in some embodiments where the values of rigged parameters saved in snapshots are interpolated to derive interpolated values.

FIG. 13 conceptually illustrates a graph 1300 of rigged values in some embodiments where the values 1305 of rigged parameters saved in snapshots are interpolated to derive interpolated values 1310. As shown, the graph 1300 depicts the values of a rigged parameter (y-axis) versus the setting of a rig control (x-axis) such as a slider position.

Values of parameters shown on vertical lines 1325 are the saved snapshot values. The "in between" values 1310 are interpolated using a linear interpolation function that interpolates the values 1305 saved in snapshots. Similarly, the values 1315 of another rigged parameter are interpolated to derive interpolated values 1320.

Figure 14:
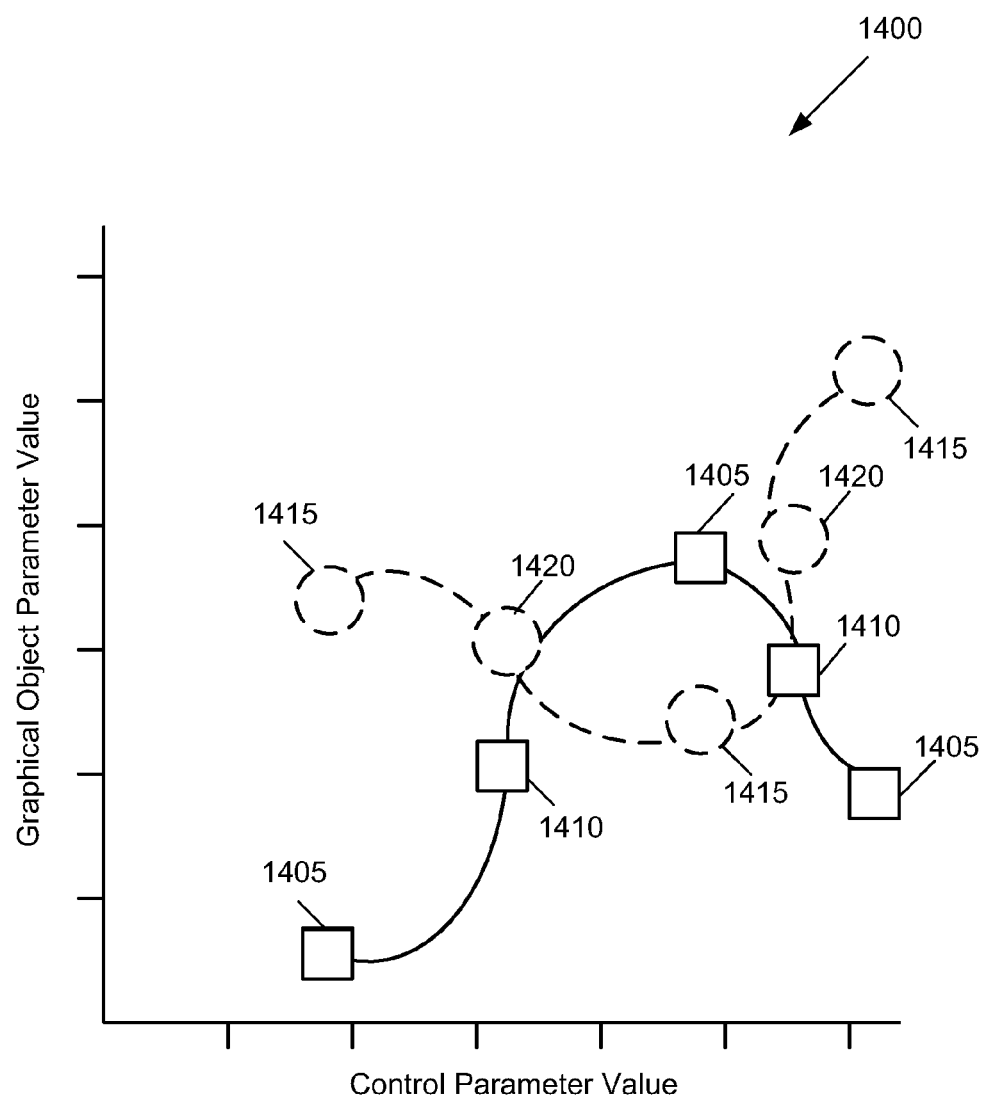
FIG. 14 conceptually illustrates a graph of rigged values of an alternate embodiment in which the interpolated values provide a smooth curve rather than just being a linear interpolation of the nearest two rigged values.

FIG. 13 illustrates a linear interpolation between the values saved in snapshots. Some embodiments utilize non-linear functions to perform interpolation. In some embodiments, the interpolation function is user selectable and the user selects (or enters) a desired interpolation function for a particular rig. FIG. 14 conceptually illustrates a graph 1400 of rigged values of an alternate embodiment in which the interpolated values 1410 provide a smooth curve rather than just being a linear interpolation of the nearest two rigged values 1405. In this embodiment, a non-linear interpolation function is used to derive the "in between" values 1410 or 1420 from the values 1405 and 1415 that are saved for two different rigged parameters.

Figure 15:
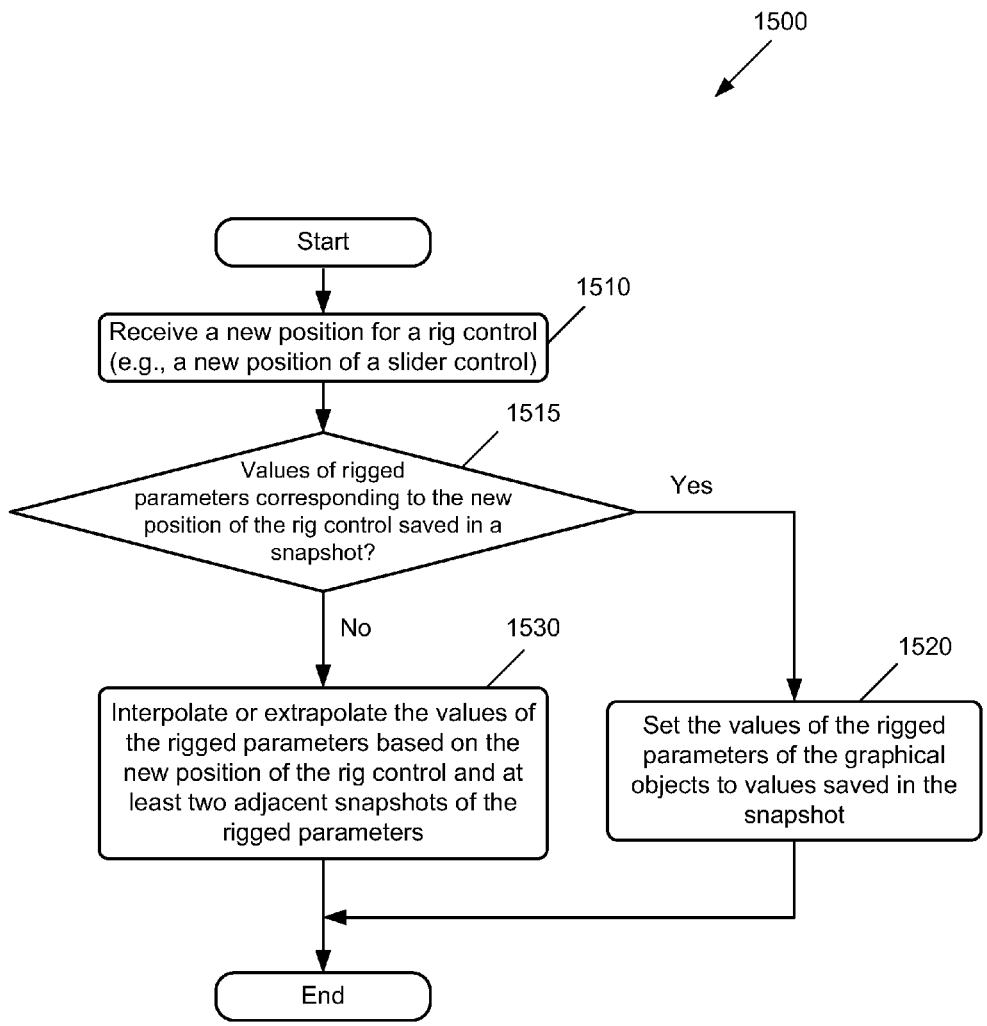
FIG. 15 conceptually illustrates a process for interpolating values of the rigged parameters in some embodiments.

FIG. 15 conceptually illustrates a process 1500 for interpolating values of the rigged parameters in some embodiments. As shown, the process receives (at 1510) a new position of a rig control (e.g., a new position of a slider control). Next, the process determines (at 1515) whether the values of the rigged parameters corresponding to the current location of the rig control are saved in a snapshot.

When the rigged values are saved in a snapshot, the process sets (at 1520) the values of the rigged parameters to values saved in the snapshot. The process then exits. Otherwise, the process interpolates or extrapolates (at 1530) the values of the rigged parameters based on the new position of the rig control, at least two adjacent rig control positions, and the values of the rigged parameters corresponding to the adjacent rig control positions. The process then exits.

D. Edit Mode

Figure 16:
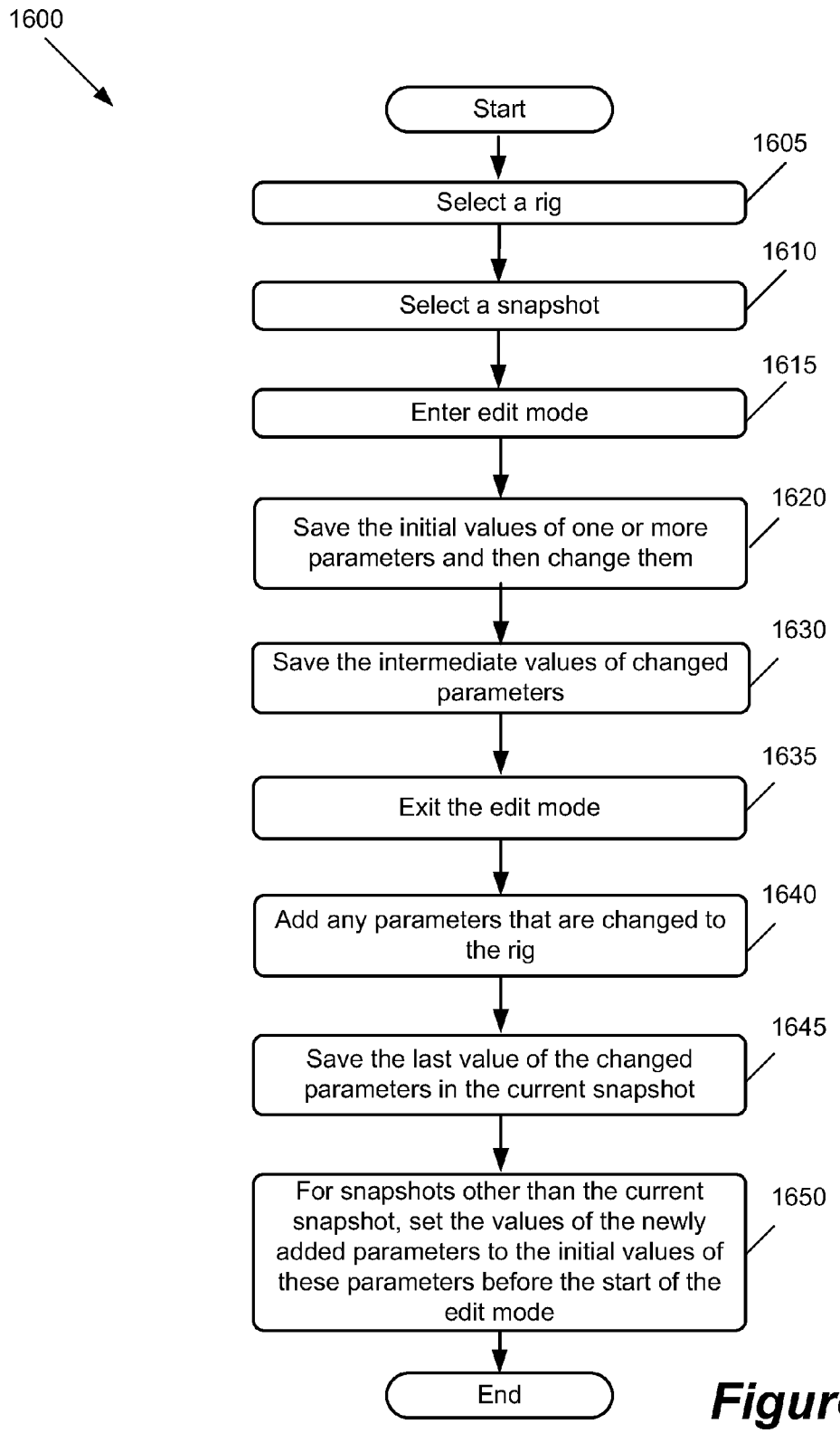
FIG. 16 conceptually illustrates a process for utilizing the edit mode to rig parameters for creating effects in some embodiments.

Some embodiments provide an edit mode which allows the values of modified parameters to automatically be added to a snapshot. FIG. 16 conceptually illustrates a process 1600 for utilizing the edit mode to rig parameters for creating effect in some embodiments. As shown, the process selects (at 1605) a rig. The process then selects (at 1610) a snapshot of the rig.

Figure 17:
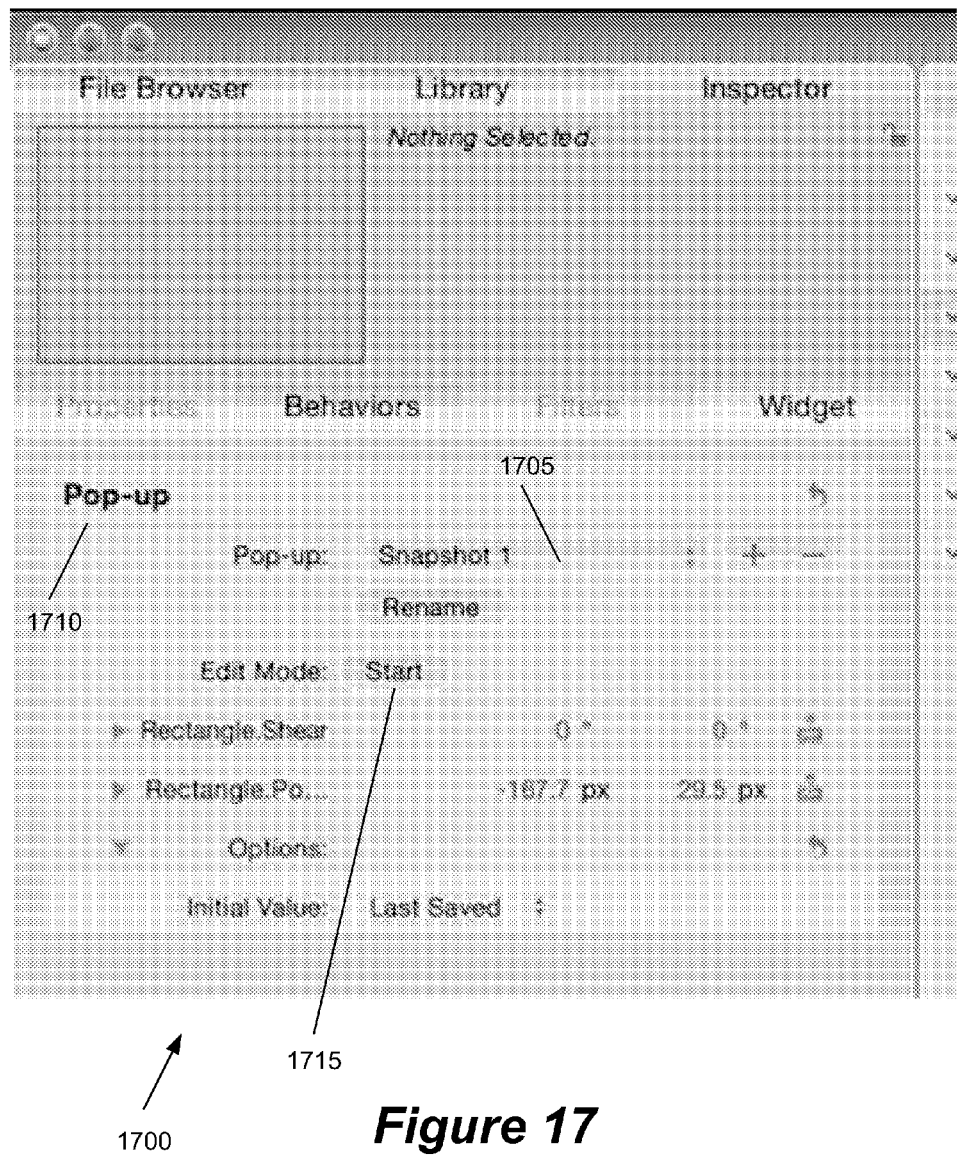
FIG. 17 conceptually illustrates a portion of a GUI for starting the edit mode of some embodiments.

Next, the process enters (at 1615) the edit mode. FIG. 17 conceptually illustrates a portion 1700 of the GUI of some embodiments. As shown, Snapshot 1 1705 of a rig 1710 is selected. FIG. 17 also shows a control a button 1715 to start edit mode. Once a user selects, by a user selection input, the start button 1715, process 1600 enters the edit mode. A subsequent selection of the button takes the process out of the edit mode.

Referring back to FIG. 16, when any parameter defined in the current project is going to be changed (e.g., when a user selection input is received to change the values of a parameter) process 1600 first saves (at 1620) the initial value of the parameter before it is first modified and then changes the parameter value. For instance, during the edit mode one or more objects are selected and one or more parameters of each object are changed. For each of these changed parameters the initial value just before the parameter is modified is saved in intermediate storage. The process saves (at 1630) the intermediate values of changed parameters.

Next, the process exits (at 1635) the edit mode. The process then adds (at 1640) any parameters that have been manipulated during the edit mode and its value has been changed to the current rig. For instance, if the position of an object (which was not rigged before) has been changed, the object position is added to the rig. The process then saves (at 1645) the last values of the changed parameters in the current snapshot.

For all other snapshots of the rig, the process sets (at 1650) the values of any newly added parameters to the value of the parameter before the start of the edit mode (i.e., the values saved during operation 1620). The process then exits. One advantage of the edit mode is automatically adding changed parameters to the rig even if these parameters where not previously selected to be part of the rig.

E. Adding Animation

Figure 18:
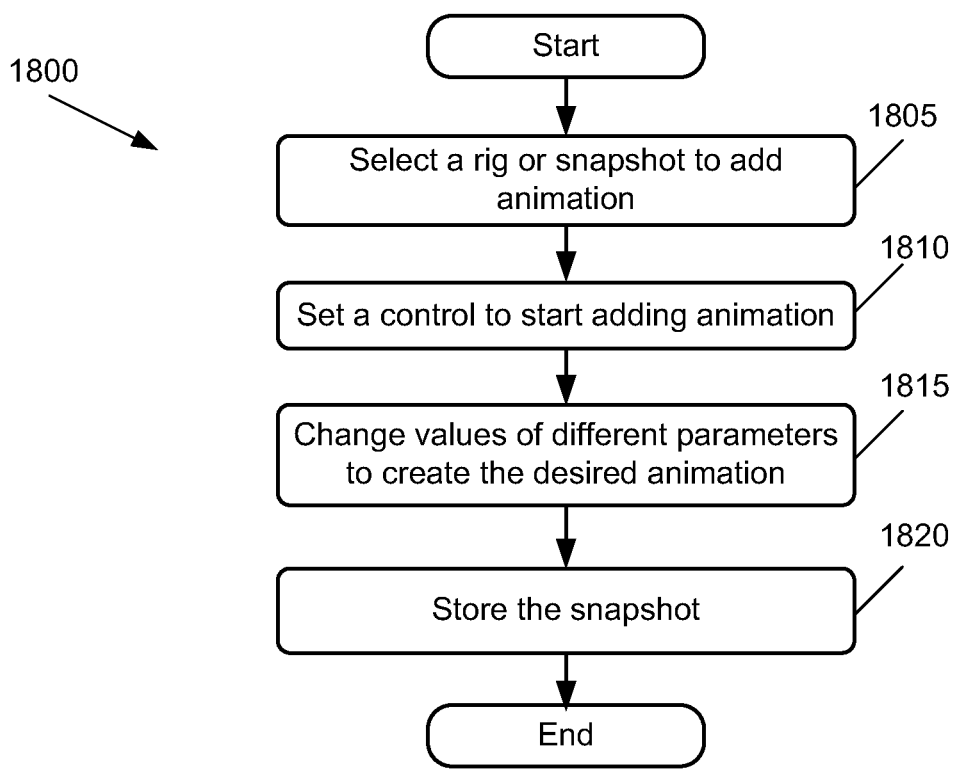
FIG. 18 conceptually illustrates a process for adding animation to a snapshot in some embodiments.

Some embodiments include animation to one or more rigs or snapshots. FIG. 18 conceptually illustrates a process 1800 for adding animation to a snapshot in some embodiments. As shown, the process selects (at 1805) a rig or snapshot to add animation. Next, the process sets (at 1810) a control to start adding animation. In some embodiments, the GUI includes a control button that a user selects to add animation.

Next, the process changes (at 1815) values of different parameters in a snapshot or changes the values of a rig control to create animation. Next, the process saves (at 1820) the values for creation of animation. The process then exits. Once such a snapshot is activated, in addition to setting the values of the parameters to the values saved in the snapshot, the associated animation is also displayed on the GUI.

In some embodiments, each snapshot can have its own independent animation. For instance, in one snapshot a position could be slowly animated left to right. In another snapshot, the position could be animated to move quickly from right to left. Also, in one rig, some snapshots might have no associated animations while other snapshots might have animation. Furthermore, animations in some embodiments are interpolated when the value of the rig control parameter (e.g., the position of the slider) is between two snapshots.

Referring to FIGS. 13 and 14, animation provides a third dimension where the third dimension is time. For snapshots that include animation, each parameter that is associated with the animation will have several values corresponding to each circle or rectangle displayed in these figures.

F. Publishing of a Rig or a Rig Group for Use by Other Applications

In some embodiments, generated rigs are published (i.e., are made available) for other applications to use. In these embodiments, the rig and associated objects are saved in a library and are imported into other applications.

Once a published rig is activated, the effect created by the rig is displayed in the graphical user interface associated with the application that has imported the rig. In some embodiments, a user of the importing application is prevented from changing the parameters or properties of the imported rig.

III. Software Architecture

Figure 19:
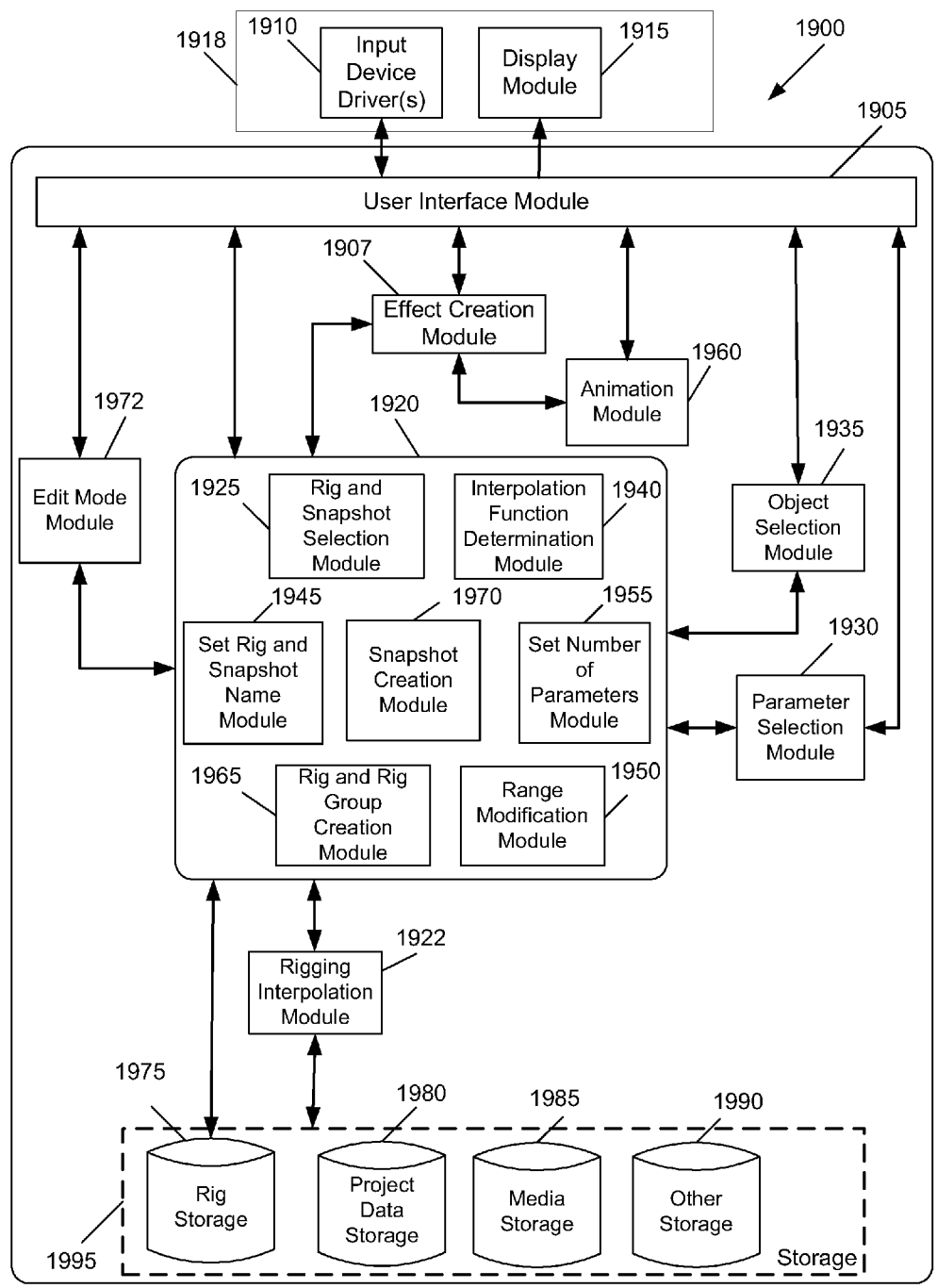
FIG. 19 conceptually illustrates the software architecture of an application for rigging parameters in some embodiments.

FIG. 19 conceptually illustrates the software architecture 1900 for rigging parameters in a media editing application in some embodiments. As shown, the application includes a user interface module 1905 which interacts with a user through the input device driver(s) 1910 and the display module 1915. The user interface module receives user selection (e.g., through the GUI 100). The user interface module passes the user inputs to other modules and sends display information to display module 1915.

FIG. 19 also illustrates an operating system 1918. As shown, in some embodiments, the device drivers 1910 and display module 1915 are part of the operating system 1918 even when the media editing application is an application separate from the operating system. The input device drivers 1910 may include drivers for translating signals from a keyboard, mouse, touchpad, drawing tablet, touchscreen, etc. A user interacts with one or more of these input devices, which send signals to their corresponding device driver. The device driver then translates the signals into user input data that is provided to the user interface module 1905.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, in some embodiments, the present application uses a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the input device. An example of a device with such a functionality is a touch screen device (e.g., as incorporated into a smart phone, a tablet computer, etc.). In some embodiments with touch control, a user directly manipulates objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

As shown in FIG. 19, the software architecture also includes a rigging module 1920, an edit mode module 1972, an effect creation module 1907, a parameter selection module 1930, an object selection module 1935, an animation module 1960, and a rigging interpolation module. The rigging module 1920 includes rig and snapshot selection module 1925, an interpolation function determination module 1940, a set rig and snapshot name module 1945, a range modification module 1950, a set number of parameters module 1955, a rig and rig group creation module 1965, and a snapshot creation module 1970. These modules perform one or more of the operations discussed for the process and methods described in different embodiments above.

The effect creation module 1907 receives inputs from user interface module and communicates with rigging module 1920 and animation module 1960 to create effects. Rigging module 1920 rigs different states of control items to a set of parameters of graphical objects.

Rig and rig group creation module 1965 creates (or deletes) rigs and rig groups. Rig and snapshot selection module 1925 selects different rigs, rig groups, or snapshots. Set rig and snapshot name module 1945 sets names for rigs, rig groups, and snapshots to default values or to user defined values. Set number of parameters module 1955 sets the number of parameters in a rig snapshots. Rig modification module 1950 modifies rigs properties (e.g., the range) of the rig's control parameter.

Interpolation function determination module 1940 receives the interpolation function associated with each control when the interpolation function is selected. Interpolation function determination module saves the interpolation function associated with each control into storage 1995. In some embodiments, a default (e.g., linear) interpolation function is assigned by the interpolation function determination module 1940 to each control prior to receiving a user defined interpolation function for the control. Snapshot creation module 1970 creates (or deletes) snapshots and receives and saves values of the control item state and the rigged parameters for each snapshot. In some embodiments, rigging module 1920 communicates with rigging interpolation module 1922 to calculate additional snapshots by interpolating values of snapshots generated by snapshot creation module 1920. As shown, different modules of the software architecture utilize different storage 1995 to store project information. The storage includes rig storage 1975, project data storage 1980, media storage 1985, as well as other storage 1990.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 20:
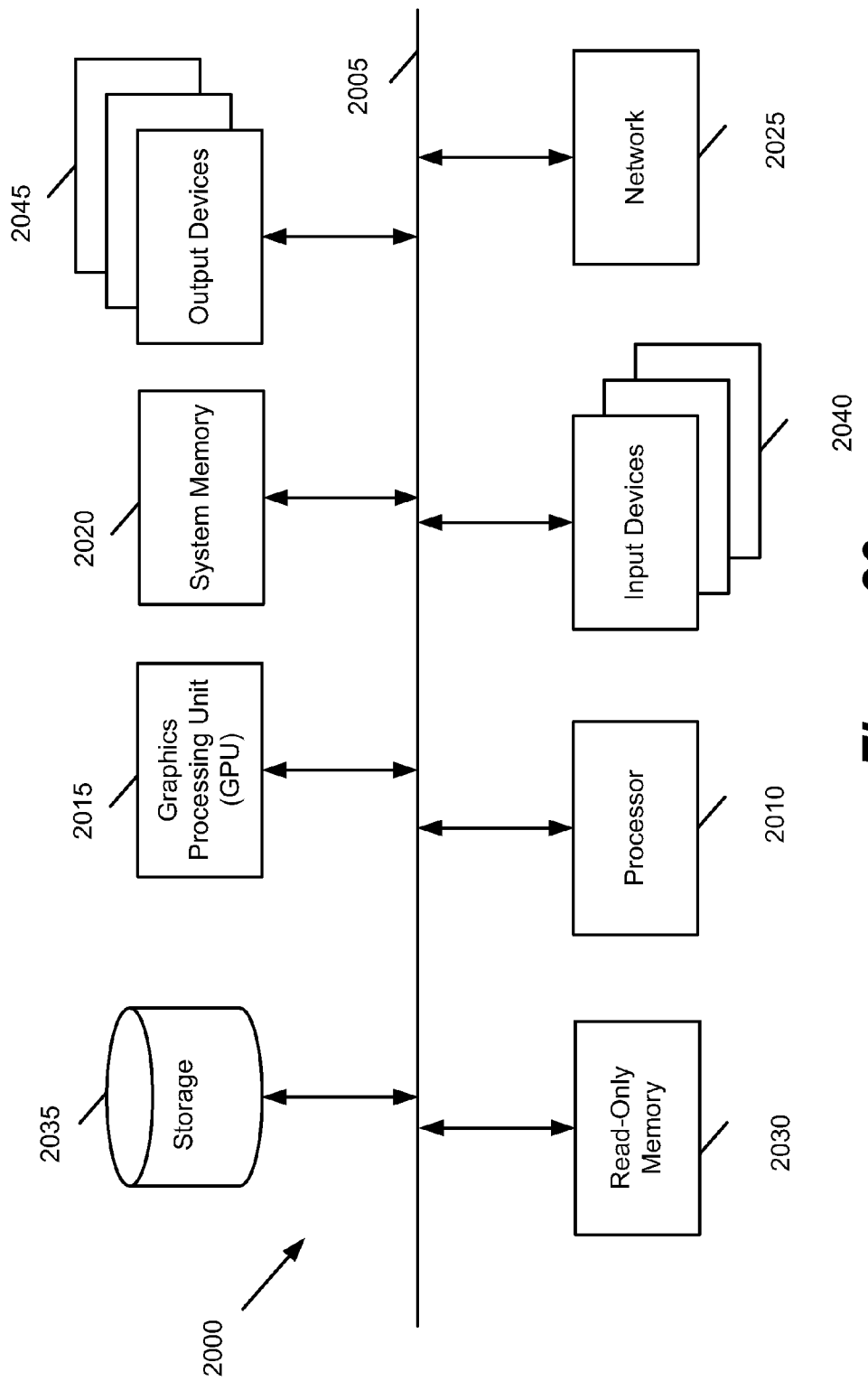
FIG. 20 conceptually illustrates an electronic system with which some embodiments are implemented.

FIG. 20 conceptually illustrates an electronic system 2000 with which some embodiments of the invention are implemented. The electronic system 2000 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2000 includes a bus 2005, processing unit(s) 2010, a graphics processing unit (GPU) 2015, a system memory 2020, a network 2025, a read-only memory 2030, a permanent storage device 2035, input devices 2040, and output devices 2045.

The bus 2005 collectively represents all system, peripheral, and chipset buses that communicatively connect the numerous internal devices of the electronic system 2000. For instance, the bus 2005 communicatively connects the processing unit(s) 2010 with the read-only memory 2030, the GPU 2015, the system memory 2020, and the permanent storage device 2035.

From these various memory units, the processing unit(s) 2010 retrieves instructions to execute and data to process in order to execute the processes of the invention. The processing unit(s) may be a single processor or a multi-core processor in different embodiments. Some instructions are passed to and executed by the GPU 2015. The GPU 2015 can offload various computations or complement the image processing provided by the processing unit(s) 2010. In some embodiments, such functionality can be provided using CoreImage's kernel shading language.

The read-only-memory (ROM) 2030 stores static data and instructions that are needed by the processing unit(s) 2010 and other modules of the electronic system. The permanent storage device 2035, on the other hand, is a read-and-write memory device. This device is a non-volatile memory unit that stores instructions and data even when the electronic system 2000 is off. Some embodiments of the invention use a mass-storage device (such as a magnetic or optical disk and its corresponding disk drive) as the permanent storage device 2035.

Other embodiments use a removable storage device (such as a floppy disk, flash memory device, etc., and its corresponding disk drive) as the permanent storage device. Like the permanent storage device 2035, the system memory 2020 is a read-and-write memory device. However, unlike storage device 2035, the system memory 2020 is a volatile read-and-write memory, such a random access memory. The system memory 2020 stores some of the instructions and data that the processor needs at runtime. In some embodiments, the invention's processes are stored in the system memory 2020, the permanent storage device 2035, and/or the read-only memory 2030. For example, the various memory units include instructions for processing multimedia clips in accordance with some embodiments. From these various memory units, the processing unit(s) 2010 retrieves instructions to execute and data to process in order to execute the processes of some embodiments.

The bus 2005 also connects to the input and output devices 2040 and 2045. The input devices 2040 enable the user to communicate information and select commands to the electronic system. The input devices 2040 include alphanumeric keyboards and pointing devices (also called "cursor control devices"), cameras (e.g., webcams), microphones or similar devices for receiving voice commands, etc. The output devices 2045 display images generated by the electronic system or otherwise output data. The output devices 2045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 20, bus 2005 also couples electronic system 2000 to a network 2025 through a network adapter (not shown). In this manner, the computer can be a part of a network of computers (such as a local area network ("LAN"), a wide area network ("WAN"), or an Intranet, or a network of networks, such as the Internet. Any or all components of electronic system 2000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 5, 7, 9-12, 15-16 and 18) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A method of creating effects in a media editing application comprising a graphical user interface (GUI), the method comprising:

at a computing device, receiving a selection of a control item having a plurality of states;

receiving a selection of a set of parameters associated with an object displayed on the GUI;

for each particular state of the control item, associating a current value of each parameter in the selected set of parameters with the particular state of the control item;

storing each particular state of the control item and the values of each parameter associated with the particular state;

receiving a selection of a state of the control item; and automatically setting the values of the set of parameters associated with the object to the stored values of parameters associated with the selected state of the control item, wherein the stored value of at least one parameter associated with the selected state is different than a value of the parameter at a time of the selection of the state of the control item.

2. The method of claim 1 further comprising:

displaying a set of different types of control items;

receiving a selection of one of the displayed types of control items;

creating the control item as a control item of the selected type; and storing the control item, wherein receiving the selection of the control item comprises receiving a selection of the stored control item.

3. The method of claim 2, wherein the set of different types of control items comprise a slider control type, a pop-up control type, and a checkbox control type.

4. The method of claim 1 further comprising displaying one or more parameters of the object after receiving the selection of the object, wherein receiving the selection of the set of parameters associated with the object comprises selecting the set of parameters from the displayed parameters.

5. The method of claim 1, wherein associating a value of each parameter to a particular state of the control item comprises:

changing the state of the control item to the particular state; and associating a current value of selected set of parameters to the particular state of the control item.

6. The method of claim 1, wherein associating a value of each parameter with a particular state of the control item comprises changing the value of at least one of the parameters prior to associating the current value of selected set of parameters with the particular state of the control item.

7. The method of claim 1, wherein the object is a first object, wherein the selected set of parameters is a first set of parameters, the method further comprising:

selecting a second object displayed on the GUI;

receiving a selection of a second set of parameters associated with the second object; and associating a current value of each parameter in the selected second set of parameters with a current state of the control item.

8. A non-transitory computer readable medium storing a computer program for a media editing application comprising a graphical user interface (GUI), the computer program for rigging parameters of graphical objects displayed on the GUI to a set of control items displayed on the GUI, the computer program executable by a processor, the computer program comprising sets of instructions for:

creating a control item having a plurality of states;

receiving a selection of a set of parameters associated with a graphical object displayed on the GUI;

changing the state of the control item to each particular state;

rigging, for each particular state of the control item, a current value of each parameter in the selected set of parameters to the particular state of the control item; and storing each particular state of the control item and the rigged parameters as a snapshot for creating a particular effect for the graphical object.

9. The non-transitory computer readable medium of claim 8, wherein the computer program further comprises sets of instructions for:

receiving a selection of a particular state of the control item; and setting the values of the set of parameters associated with the object to the values rigged to the particular state of the control item.

10. The non-transitory computer readable medium of claim 8, wherein the set of instructions for creating the control item comprises sets of instructions for:

displaying a set of different types of control items;

receiving a selection of one of the displayed types of control items; and creating the control item as a control item of the selected type.

11. The non-transitory computer readable medium of claim 8, wherein the computer program further comprises a set of instructions for displaying one or more parameters of the object after receiving the selection of the object, wherein the set of instructions for receiving the selection of the set of parameters associated with the object comprises a set of instructions for receiving a selection of the set of parameters from the displayed parameters.

12. The non-transitory computer readable medium of claim 8, wherein the set of instructions for rigging a value of each parameter to a particular state of the control item comprises sets of instructions for:

changing the state of the control item;

changing the value of at least one of the parameters; and associating a current value of selected set of parameters with a current state of the control item.

13. The non-transitory computer readable medium of claim 8 further comprising sets of instructions for:

receiving a change to one or more parameters of the object;

rigging the current value of each parameter in the selected set of parameters to the particular state of the control item; and storing the particular state of the control item and the rigged parameters as a snapshot for creating the particular effect for the graphical object.

14. A non-transitory machine readable medium storing a computer program for generating computer graphics, the computer program executable by at least one processing unit, the computer program comprising a graphical user interface (GUI) for creating effects by rigging a plurality of parameters to a state of a control item, the GUI comprising:

a tool for creating the control item having a plurality of states;

a display area for displaying graphical objects;

a tool for selecting graphical objects;

a tool for selecting a set of parameters associated with a selected graphical object; and a tool for rigging each of the plurality of states of the control item to a set of values of the selected set of parameters, wherein changing the state of the control item to a particular state sets the values of the set of parameters of the graphical object to the values of the parameters rigged to the particular state of the control item.

15. The non-transitory machine readable medium of claim 14, wherein the display area is a first display area, the GUI further comprising a second display area for displaying one or more parameters of a selected graphical object, wherein the tool for selecting the set of parameters selects one or more parameters displayed on the second display area.

16. The non-transitory machine readable medium of claim 14, wherein the GUI further comprises a tool for creating a rig group comprising a plurality of control items, each control item comprising a plurality of states, each state of a control item in the rig group rigged to each of corresponding values of a set of parameters of the graphical object.

17. The non-transitory machine readable medium of claim 14, wherein the GUI further comprises a tool for entering and exiting an edit mode, wherein values of any parameters associated with graphical objects changed while in edit mode are automatically rigged to a current state of a selected control item.

18. The non-transitory machine readable medium of claim 14, wherein the GUI further comprises a tool for changing a number of states of control items.

19. A non-transitory machine readable medium storing a computer program for creating effects in a media editing application comprising a graphical user interface (GUI), the computer program executable by at least one processing unit, the computer program comprising sets of instructions for:
   selecting a control item having a plurality of states;
   entering an edit mode after receiving a command to enter the edit mode;
   changing values of a set of parameters associated with a set of graphical objects displayed on the GUI;
   exiting the edit mode after receiving a command to exit the edit mode;
   associating current values of changed parameters with a current state of the control item; and
   storing the current state of the control item and the associated values of the changed parameters as a snapshot of values for creating a visual effect.

20. The non-transitory machine readable medium of claim 19, wherein the computer program further comprises sets of instructions for:
   storing a current value of parameters before the values of the parameters change for a first time while in the edit mode; and
   associating, for each state of the control item other than the current state, the stored values of the changed parameters with the state of the control item after exiting the edit mode.

21. A method of creating effects in a media editing application comprising a graphical user interface (GUI), the method comprising:
   at a computing device, selecting a control item having a plurality of states;
   selecting a first set of parameters of a graphical object;
   rigging values of the first set of parameters to a current state of the control item;
   entering an edit mode after receiving a command to enter the edit mode;
   changing values of a second set of parameters associated with a set of graphical objects displayed on the GUI;
   exiting the edit mode after receiving a command to exit the edit mode; and
   automatically rigging current values of the second set of parameters to the current state of the control item.

22. The method of claim 21 further comprising storing the current state of the control item, the rigged values of the first and second sets of parameters as a snapshot of values for creating a visual effect.

23. The method of claim 21 further comprising:
   saving values of parameters before the current values of the parameters change for a first time while in the edit mode; and
   for each state of the control item other than the current state, rigging the saved values of the second set of parameters to the state of the control item after exiting the edit mode.

* * * * *